(12) United States Patent
Hazard et al.

(10) Patent No.: US 12,443,863 B1
(45) Date of Patent: *Oct. 14, 2025

(54) COMPUTER-BASED REASONING SYSTEM FOR OPERATIONAL SITUATION CONTROL OF CONTROLLABLE SYSTEMS

(71) Applicant: Howso Incorporated, Raleigh, NC (US)

(72) Inventors: Christopher James Hazard, Raleigh, NC (US); Michael Vincent Capps, Raleigh, NC (US)

(73) Assignee: Howso Incorporated, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,713

(22) Filed: Mar. 11, 2024

Related U.S. Application Data

(63) Continuation of application No. 17/347,051, filed on Jun. 14, 2021, now Pat. No. 11,941,542, which is a continuation-in-part of application No. 17/346,901, filed on Jun. 14, 2021, now Pat. No. 11,727,286, which is a continuation-in-part of application No. 17/333,671, filed on May 28, 2021, now Pat. No. 11,640,561, which is a continuation-in-part of application No. 17/038,955, filed on Sep. 30, 2020, now Pat. No. 11,676,069, which is a continuation-in-part of application No. 17/006,144, filed on Aug. 28, 2020, now Pat. No. 11,669,769, which is a continuation of application No. 16/713,714, filed on Dec. 13, 2019, now Pat. No. 11,625,625, which is a continuation-in-part of application No. 16/219,476, filed on Dec. 13, 2018, (Continued)

(51) Int. Cl.
*G06F 15/16* (2006.01)
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
CPC ................................ G06N 5/04; G06N 20/00
USPC .......................................................... 709/200
See application file for complete search history.

(56) References Cited

U.S. PATENT DOCUMENTS

| | | |
|---|---|---|
| 4,935,877 A | 6/1990 | Koza |
| 5,581,664 A | 12/1996 | Allen et al. |

(Continued)

FOREIGN PATENT DOCUMENTS

| | | |
|---|---|---|
| WO | WO2017057528 | 4/2017 |
| WO | WO2017189859 | 11/2017 |

OTHER PUBLICATIONS

Abdi, "Cardinality Optimization Problems", The University of Birmingham, PhD Dissertation, May 2013, 197 pages.

(Continued)

*Primary Examiner* — Moustafa M Meky
(74) *Attorney, Agent, or Firm* — Dority & Manning, P.A.

(57) ABSTRACT

Techniques are provided for operational situation vehicle control, and include determining action and context data for one or more vehicle operations in one or more operational situations, training vehicle control rules for those operational situations, and using those vehicle control rules to control vehicles in compatible operational situations.

20 Claims, 4 Drawing Sheets

Related U.S. Application Data now abandoned, said application No. 17/347,051 is a continuation-in-part of application No. 15/817,627, filed on Nov. 20, 2017, now Pat. No. 11,092,962.

(60) Provisional application No. 63/179,916, filed on Apr. 26, 2021, provisional application No. 63/168,521, filed on Mar. 31, 2021, provisional application No. 63/036,741, filed on Jun. 9, 2020, provisional application No. 63/024,152, filed on May 13, 2020, provisional application No. 62/814,585, filed on Mar. 6, 2019.

(56) References Cited

U.S. PATENT DOCUMENTS

| | | |
|---|---|---|
| 6,282,527 B1 | 8/2001 | Gounares et al. |
| 6,741,972 B1 | 5/2004 | Girardi et al. |
| 7,529,744 B1 | 5/2009 | Srivastava et al. |
| 7,873,587 B2 | 1/2011 | Baum |
| 9,489,635 B1 | 11/2016 | Zhu |
| 9,703,541 B2 | 7/2017 | Sharifi et al. |
| 9,922,286 B1 * | 3/2018 | Hazard .................. G06N 20/00 |
| 10,459,444 B1 | 10/2019 | Kentley-Klay |
| 10,609,044 B2 | 3/2020 | Andow et al. |
| 11,003,863 B2 * | 5/2021 | Hall .................. G06F 40/30 |
| 11,092,962 B1 * | 8/2021 | Hazard .................. G06N 20/00 |
| 11,326,208 B2 | 5/2022 | Rabinowitz et al. |
| 11,941,542 B2 * | 3/2024 | Hazard .................. G06N 5/045 |
| 2001/0049595 A1 | 12/2001 | Plumer et al. |
| 2004/0019851 A1 | 1/2004 | Purvis et al. |
| 2005/0137992 A1 | 6/2005 | Polak |
| 2006/0195204 A1 | 8/2006 | Bonabeau et al. |
| 2008/0153098 A1 | 6/2008 | Rimm et al. |
| 2008/0307399 A1 | 12/2008 | Zhou et al. |
| 2009/0006299 A1 | 1/2009 | Baum |
| 2009/0144704 A1 | 6/2009 | Niggemann et al. |
| 2009/0327172 A1 * | 12/2009 | Liu .................. G06N 20/00 706/12 |
| 2010/0106603 A1 | 4/2010 | Dey et al. |
| 2010/0287507 A1 | 11/2010 | Paquette et al. |
| 2010/0332514 A1 | 12/2010 | Steele et al. |
| 2011/0060895 A1 | 3/2011 | Solomon |
| 2011/0161264 A1 | 6/2011 | Cantin |
| 2011/0225564 A1 | 9/2011 | Biswas et al. |
| 2013/0006901 A1 | 1/2013 | Cantin |
| 2013/0339365 A1 | 12/2013 | Balasubramanian et al. |
| 2016/0055427 A1 | 2/2016 | Adjaoute |
| 2017/0010106 A1 | 1/2017 | Shashua et al. |
| 2017/0012772 A1 | 1/2017 | Mueller |
| 2017/0053211 A1 | 2/2017 | Heo et al. |
| 2017/0091645 A1 | 3/2017 | Matus |
| 2017/0161640 A1 | 6/2017 | Shamir |
| 2017/0236060 A1 | 8/2017 | Ignatyev |
| 2018/0072323 A1 | 3/2018 | Gordon et al. |
| 2018/0089563 A1 | 3/2018 | Redding et al. |
| 2018/0225375 A1 | 8/2018 | Collins et al. |
| 2018/0225583 A1 | 8/2018 | Chen et al. |
| 2018/0235649 A1 | 8/2018 | Elkadi |
| 2018/0336018 A1 | 11/2018 | Lu et al. |
| 2018/0359266 A1 | 12/2018 | Andow et al. |
| 2019/0147331 A1 | 5/2019 | Arditi |
| 2020/0302019 A1 * | 9/2020 | Hall .................. G10L 15/22 |

OTHER PUBLICATIONS

Aboulnaga, "Generating Synthetic Complex-structured XML Data", Proceedings of the Fourth International Workshop on the Web and Databases, WebDB 2001, Santa Barbara, California, USA, May 24-25, 2001, 6 pages.

Abramson, "The Expected-Outcome Model of Two-Player Games", PhD Thesis, Columbia University, New York, New York, 1987, 125 pages.

Abuelaish et al., "Analysis and Modelling of Groundwater Salinity Dynamics in the Gaza Strip", Cuadernos Geograficos, vol. 57, Issue 2, pp. 72-91.

Agarwal et al., "Nearest-Neighbor Searching Under Uncertainty II", ACM Transactions on Algorithms, vol. 13, Issue 1, Article 3, 2016, 25 pages.

Aggarwal et al., "On the Surprising Behavior of Distance Metrics in High Dimensional Space", International Conference on Database Theory, London, United Kingdom, Jan. 4-6, 2001, pp. 420-434.

Akaike, "Information Theory and an Extension of the Maximum Likelihood Principle", Proceedings of the 2nd International Symposium on Information Theory, Sep. 2-8, 1971, Tsahkadsor, Armenia, pp. 267-281.

Alhaija, "Augmented Reality Meets Computer Vision: Efficient Data Generation for Urban Driving Scenes", arXiv:1708.01566v1, Aug. 4, 2017, 12 pages.

Alpaydin, "Machine Learning: The New AI", MIT Press, Cambridge, Massachusetts, 2016, 225 pages.

Alpaydin, "Voting Over Multiple Condensed Nearest Neighbor", Artificial Intelligence Review, vol. 11, 1997, pp. 115-132.

Altman, "An Introduction to Kernel and Nearest-Neighbor Nonparametric Regression", The American Statistician, vol. 46, Issue 3, 1992, pp. 175-185.

Anderson, "Synthetic data generation for the internet of things," 2014 IEEE International Conference on Big Data (Big Data), Washington, DC, 2014, pp. 171-176.

Archer et al., "Empirical Characterization of Random Forest Variable Importance Measures", Computational Statistics & Data Analysis, vol. 52, 2008, pp. 2249-2260.

Beyer et al., "When is 'Nearest Neighbor' Meaningful?" International Conference on Database Theory, Springer, Jan. 10-12, 1999, Jerusalem, Israel, pp. 217-235.

Bull, Haploid-Diploid Evolutionary Algorithms: The Baldwin Effect and Recombination Nature's Way, Artificial Intelligence and Simulation of Behaviour Convention, Apr. 19-21, 2017, Bath, United Kingdom, pp. 91-94.

Cano et al., "Evolutionary Stratified Training Set Selection for Extracting Classification Rules with Tradeoff Precision-Interpretability" Data and Knowledge Engineering, vol. 60, 2007, pp. 90-108.

Chawla, "SMOTE: Synthetic Minority Over-sampling Technique", arXiv:1106.1813v1, Jun. 9, 2011, 37 pages.

Chen, "DropoutSeer: Visualizing Learning Patterns in Massive Open Online Courses for Dropout Reasoning and Prediction", 2016 IEEE Conference on Visual Analytics Science and Technology (VAST), Oct. 23-28, 2016, Baltimore, Maryland, USA, 10 pages.

Chomboon et al., An Empirical Study of Distance Metrics for k-Nearest Neighbor Algorithm, 3rd International Conference on Industrial Application Engineering, Kitakyushu, Japan, Mar. 28-31, 2015, pp. 280-285.

Colakoglu, "A Generalization of the Minkowski Distance and a New Definition of the Ellipse", arXiv:1903.09657v1, Mar. 2, 2019, 18 pages.

Dernoncourt, "MoocViz: A Large Scale, Open Access, Collaborative, Data Analytics Platform for MOOCs", NIPS 2013 Education Workshop, Nov. 1, 2013, Lake Tahoe, Utah, USA, 8 pages.

Ding, "Generating Synthetic Data for Neural Keyword-to-Question Models", arXiv:1807.05324v1, Jul. 18, 2018, 12 pages.

Dwork et al., "The Algorithmic Foundations of Differential Privacy", Foundations and Trends in Theoretical Computer Science, vol. 9, Nos. 3-4, 2014, pp. 211-407.

Efros et al., "Texture Synthesis by Non-Parametric Sampling", International Conference on Computer Vision, Sep. 20-25, 1999, Corfu, Greece, 6 pages.

Fathony, "Discrete Wasserstein Generative Adversarial Networks (DWGAN)", OpenReview.net, Feb. 18, 2018, 20 pages.

Ganegedara et al., "Self Organizing Map Based Region of Interest Labelling for Automated Defect Identification in Large Sewer Pipe Image Collections", IEEE World Congress on Computational Intelligence, Jun. 10-15, 2012, Brisbane, Australia, 8 pages.

(56) References Cited

OTHER PUBLICATIONS

Gao et al., "Efficient Estimation of Mutual Information for Strongly Dependent Variables", 18th International Conference on Artificial Intelligence and Statistics, San Diego, California, May 9-12, 2015, pp. 277-286.
Gehr et al., "AI2: Safety and Robustness Certification of Neural Networks with Abstract Interpretation", 39th IEEE Symposium on Security and Privacy, San Francisco, California, May 21-23, 2018, 16 pages.
Gemmeke et al., "Using Sparse Representations for Missing Data Imputation in Noise Robust Speech Recognition", European Signal Processing Conference, Lausanne, Switzerland, Aug. 25-29, 2008, 5 pages.
Ghosh, "Inferential Privacy Guarantees for Differentially Private Mechanisms", arXiv:1603:.01508v1, Mar. 4, 2016, 31 pages.
Goodfellow et al., "Deep Learning", 2016, 800 pages.
Google AI Blog, "The What-If Tool: Code-Free Probing of Machine Learning Models", Sep. 11, 2018, https://pair-code,github.io/what-if-tool, retrieved on Mar. 14, 2019, 5 pages.
Gottlieb et al., "Near-Optimal Sample Compression for Nearest Neighbors", Advances in Neural Information Processing Systems, Montreal, Canada, Dec. 8-13, 2014, 9 pages.
Gray, "Quickly Generating Billion-Record Synthetic Databases", SIGMOD '94: Proceedings of the 1994 ACM SIGMOD international conference on Management of data, May 1994, Minneapolis, Minnesota, USA, 29 pages.
Hastie et al., "The Elements of Statistical Learning", 2001, 764 pages.
Hazard et al., "Natively Interpretable Machine Learning and Artificial Intelligence: Preliminary Results and Future Directions", arXiv:1901v1, Jan. 2, 2019, 15 pages.
Hinneburg et al., "What is the Nearest Neighbor in High Dimensional Spaces?", 26th International Conference on Very Large Databases, Cairo, Egypt, Sep. 10-14, 2000, pp. 506-515.
Hmeidi et al., "Performance of KNN and SVM Classifiers on Full Word Arabic Articles", Advanced Engineering Informatics, vol. 22, Issue 1, 2008, pp. 106-111.
Hoag "A Parallel General-Purpose Synthetic Data Generator", ACM SIGMOID Record, vol. 6, Issue 1, Mar. 2007, 6 pages.
Houle et al., "Can Shared-Neighbor Distances Defeat the Curse of Dimensionality?, International Conference on Scientific and Statistical Database Management", Heidelberg, Germany, Jun. 31-Jul. 2, 2010, 18 pages.
Imbalanced-learn, "SMOTE", 2016-2017, https://imbalanced-learn.readthedocs.io/en/stable/generated/imblearn.over_sampling.SMOTE.html, retrieved on Aug. 11, 2020, 6 pages.
Indyk et al., "Approximate Nearest Neighbors: Towards Removing the Curse of Dimensionality", Procedures of the 30th ACM Symposium on Theory of Computing, Dallas, Texas, May 23-26, 1998, pp. 604-613.
International Search Report and Written Opinion for PCT/US2018/047118, mailed on Dec. 3, 2018, 9 pages.
International Search Report and Written Opinion for PCT/US2019/026502, mailed on Jul. 24, 2019, 16 pages.
International Search Report and Written Opinion for PCT/US2019/066321, mailed on Mar. 19, 2020, 17 pages.
Internet Archive, "SystemVerilog distribution Constraint—Verification Guide", Aug. 6, 2018, http://web.archive.org/web/20180806225430/https://www.verificationguide.com/p/systemverilog-distribution-constraint.html, retrieved on Mar. 3, 2020, 4 pages.
Internet Archive, "System Verilog Testbench Automation Tutorial", Nov. 17, 2016, https://web.archive.org/web/20161117153225/http://www.doulos.com/knowhow/sysverilog/tutorial/constraints/, retrieved on Mar. 3, 2020, 6 pages.
Kittler, "Feature Selection and Extraction", Handbook of Pattern Recognition and Image Processing, Jan. 1986, Chapter 3, pp. 115-132.
Kohavi et al., "Wrappers for Feature Subset Selection", Artificial Intelligence, vol. 97, Issues 1-2, Dec. 1997, pp. 273-323.

Kontorovich et al., "Nearest-Neighbor Sample Compression: Efficiency, Consistency, Infinite Dimensions, Advances in Neural Information Processing Systems", 2017, pp. 1573-1583.
Kulkarni et al., "Hierarchical Deep Reinforcement Learning: Integrating Temporal Abstraction and Intrinsic Motivation", arXiv:1604.06057v2, May 31, 2016, 14 pages.
Kuramochi et al., "Gene Classification using Expression Profiles: A Feasibility Study", Technical Report TR 01-029, Department of Computer Science and Engineering, University of Minnesota, Jul. 23, 2001, 18 pages.
Kushilevitz et al., "Efficient Search for Approximate Nearest Neighbor in High Dimensional Spaces", Society for Industrial and Applied Mathematics Journal Computing, vol. 30, No. 2, pp. 457-474.
Leinster et al., "Maximizing Diversity in Biology and Beyond", Entropy, vol. 18, Issue 3, 2016, 23 pages.
Liao et al., "Similarity Measures for Retrieval in Case-Based Reasoning Systems", Applied Artificial Intelligence, vol. 12, 1998, pp. 267-288.
Lin et al., "Why Does Deep and Cheap Learning Work So Well?" Journal of Statistical Physics, vol. 168, 2017, pp. 1223-1247.
Lin, "Development of a Synthetic Data Set Generator for Building and Testing Information Discovery Systems", Proceedings of the Third International Conference on Information Technology: New Generations, Nevada, USA, Apr. 10-12, 2016, Las Vegas, Nevada, USA, 6 pages.
Lukaszyk, "A New Concept of Probability Metric and its Applications in Approximation of Scattered Data Sets", Computational Mechanics, vol. 33, 2004, pp. 299-304.
Lukaszyk, "Probability Metric, Examples of Approximation Applications in Experimental Mechanics", PhD Thesis, Cracow University of Technology, 2003, 149 pages.
Mann et al., "On a Test of Whether One or Two Random Variables is Stochastically Larger than the Other", The Annals of Mathematical Statistics, 1947, pp. 50-60.
Martino et al., "A Fast Universal Self-Tuned Sampler within Gibbs Sampling", Digital Signal Processing, vol. 47, 2015, pp. 68-83.
Mohri et al., Foundations of Machine Learning, 2012, 427 pages—uploaded as Part 1 and Part 2.
Montanez, "SDV: An Open Source Library for Synthetic Data Generation", Massachusetts Institute of Technology, Master's Thesis, Sep. 2018, 105 pages.
Negra, "Model of a Synthetic Wind Speed Time Series Generator", Wind Energy, Wiley Interscience, Sep. 6, 2007, 17 pages.
Nguyen et al., "NP-Hardness of $\ell$ 0 Minimization Problems: Revision and Extension to the Non-Negative Setting", 13th International Conference on Sampling Theory and Applications, Jul. 8-12, 2019, Bordeaux, France, 4 pages.
Olson et al., "PMLB: A Large Benchmark Suite for Machine Learning Evaluation and Comparison", arXiv:1703.00512v1, Mar. 1, 2017, 14 pages.
Patki, "The Synthetic Data Vault: Generative Modeling for Relational Databases", Massachusetts Institute of Technology, Master's Thesis, Jun. 2016, 80 pages.
Patki, "The Synthetic Data Vault", 2016 IEEE International Conference on Data Science and Advanced Analytics (DSAA), Oct. 17-19, 2016, Montreal, QC, pp. 399-410.
Pedregosa et al., "Machine Learning in Python", Journal of Machine Learning Research, vol. 12, 2011, pp. 2825-2830.
Pei, "A Synthetic Data Generator for Clustering and Outlier Analysis", The University of Alberta, 2006, 33 pages.
Phan et al., "Adaptive Laplace Mechanism: Differential Privacy Preservation in Deep Learning" 2017 IEEE International Conference on Data Mining, New Orleans, Louisiana, Nov. 18-21, 2017, 10 pages.
Poerner et al., "Evaluating Neural Network Explanation Methods Using Hybrid Documents and Morphosyntactic Agreement", Proceedings of the 56th Annual Meeting of the Association for Computational Linguistics (Long Papers), Melbourne, Australia, Jul. 15-20, 2018, pp. 340-350.

(56) References Cited

OTHER PUBLICATIONS

Prakosa "Generation of Synthetic but Visually Realistic Time Series of Cardiac Images Combining a Biophysical Model and Clinical Images" IEEE Transactions on Medical Imaging, vol. 32, No. 1, Jan. 2013, pp. 99-109.

Priyardarshini, "WEDAGEN: A synthetic web database generator", International Workshop of Internet Data Management (IDM'99), Sep. 2, 1999, Florence, IT, 24 pages.

Pudjijono, "Accurate Synthetic Generation of Realistic Personal Information" Advances in Knowledge Discovery and Data Mining, Pacific-Asia Conference on Knowledge Discovery and Data Mining, Apr. 27-30, 2009, Bangkok, Thailand, 12 pages.

Raikwal et al., "Performance Evaluation of SVM and K-Nearest Neighbor Algorithm Over Medical Data Set", International Journal of Computer Applications, vol. 50, No. 14, Jul. 2012, pp. 975-985.

Rao et al., "Cumulative Residual Entropy: A New Measure of Information", IEEE Transactions on Information Theory, vol. 50, Issue 6, 2004, pp. 1220-1228.

Reiter, "Using CART to Generate Partially Synthetic Public Use Microdata" Journal of Official Statistics, vol. 21, No. 3, 2005, pp. 441-462.

Ribeiro et al., "'Why Should I Trust You': Explaining the Predictions of Any Classifier", arXiv:1602.04938v3, Aug. 9, 2016, 10 pages.

Rosenberg et al., "Semi-Supervised Self-Training of Object Detection Models", IEEE Workshop on Applications of Computer Vision, 2005, 9 pages.

Schaul et al., "Universal Value Function Approximators", International Conference on Machine Learning, Lille, France, Jul. 6-11, 2015, 9 pages.

Schlabach et al., "FOX-GA: A Genetic Algorithm for Generating and ANalayzing Battlefield COurses of Action", 1999 MIT.

Schreck, "Towards An Automatic Predictive Question Formulation", Massachusetts Institute of Technology, Master's Thesis, Jun. 2016, 121 pages.

Schreck, "What would a data scientist ask? Automatically formulating and solving prediction problems", 2016 IEEE International Conference on Data Science and Advanced Analytics (DSAA), Oct. 17-19, 2016, Montreal, QC, pp. 440-451.

Schuh et al., "Improving the Performance of High-Dimensional KNN Retrieval Through Localized Dataspace Segmentation and Hybrid Indexing", Proceedings of the 17th East European Conference, Advances in Databases and Information Services, Genoa, Italy, Sep. 2013, pp. 344-357.

Schuh et al., "Mitigating the Curse of Dimensionality for Exact KNN Retrieval", Proceedings of the 26th International Florida Artificial Intelligence Research Society Conference, St. Pete Beach, Florida, May 22-24, 2014, pp. 363-368.

Schwarz et al., "Estimating the Dimension of a Model", The Annals of Statistics, vol. 6, Issue 2, Mar. 1978, pp. 461-464.

Silver et al., "Mastering the Game of Go Without Human Knowledge", Nature, vol. 550, Oct. 19, 2017, pp. 354-359.

Skapura, "Building Neural Networks", 1996, p. 63.

Smith, "FeatureHub: Towards collaborative data science", 2017 IEEE International Conference on Data Science and Advanced Analytics (DSAA), Oct. 19-21, 2017, Tokyo, pp. 590-600.

Stephenson et al., "A Continuous Information Gain Measure to Find the Most Discriminatory Problems for AI Benchmarking", arxiv.org, arxiv.org/abs/1809.02904v2, retrieved on Aug. 21, 2019, 8 pages.

Stoppiglia et al., "Ranking a Random Feature for Variable and Feature Selection" Journal of Machine Learning Research, vol. 3, 2003, pp. 1399-1414.

Sun et al., "Fuzzy Modeling Employing Fuzzy Polyploidy Genetic Algorithms", Journal of Information Science and Engineering, Mar. 2002, vol. 18, No. 2, pp. 163-186.

Sun, "Learning Vine Copula Models For Synthetic Data Generation", arXiv:1812.01226v1, Dec. 4, 2018, 9 pages.

Surya et al., "Distance and Similarity Measures Effect on the Performance of K-Nearest Neighbor Classifier", arXiv:1708.04321v1, Aug. 14, 2017, 50 pages.

Tan et al., "Incomplete Multi-View Weak-Label Learning", 27th International Joint Conference on Artificial Intelligence, 2018, pp. 2703-2709.

Tao et al., "Quality and Efficiency in High Dimensional Nearest Neighbor Search", Proceedings of the 2009 ACM SIGMOD International Conference on Management of Data, Providence, Rhode Island, Jun. 29-Jul. 2, 2009, pp. 563-576.

Tishby et al., "Deep Learning and the Information Bottleneck Principle", arXiv:1503.02406v1, Mar. 9, 2015, 5 pages.

Tockar, "Differential Privacy: The Basics", Sep. 8, 2014, https://research.neustar.biz/2014/09/08/differential-privacy-the-basics/ retrieved on Apr. 1, 2019, 3 pages.

Tomasev et al., "Hubness-aware Shared Neighbor Distances for High-Dimensional k-Nearest Neighbor Classification", 7th international Conference on Hybrid Artificial Intelligent Systems, Salamanca, Spain, Mar. 28-30, 2012, 38 pages.

Tran, "Dist-GAN: An Improved GAN Using Distance Constraints", arXiv:1803.08887V3, Dec. 15, 2018, 20 pages.

Trautmann et al., "On the Distribution of the Desirability Index using Harrington's Desirability Function", Metrika, vol. 63, Issue 2, Apr. 2006, pp. 207-213.

Triguero et al., "Self-Labeled Techniques for Semi-Supervised Learning: Taxonomy, Software and Empirical Study", Knowledge and Information Systems, vol. 42, Issue 2, 2015, pp. 245-284.

Tuomisto, "A Consistent Terminology for Quantifying Species Diversity? Yes, It Does Exist" Oecologia, vol. 164, 2010, pp. 853-860.

Vacek et al., "Using Case-Based Reasoning for Autonomous Vehicle Guidance", International Conference on Intelligent Robots and Systems, San Diego, California, Oct. 29-Nov. 2, 2007, 5 pages.

Verleysen et al., "The Curse of Dimensionality in Data Mining and Time Series Prediction" International Work-Conference on Artificial Neural Networks, Barcelona, Spain, Jun. 8-10, 2005, pp. 758-770.

Viera, "Generating Synthetic Sequential Data using GANs", Medium: Toward AI, Jun. 29, 2020, 31 pages.

Wachter et al., "Counterfactual Explanations Without Opening the Black Box: Automated Decisions and the GDPR", Harvard Journal of Law and Technology, vol. 31, No. 2, Spring 2018, 47 pages.

Wang et al., "Falling Rule Lists" 18th International Conference on Artificial Intelligence and Statistics, San Diego, California, May 9-12, 2015, 10 pages.

Wei et al., "An Operation-Time Simulation Framework for UAV Swarm Configuration and Mission Planning", 2013.

Weselkowski et al., "TraDE: Training Device Selection via Multi-Objective Optimization", IEEE 2014.

Wu, "The Synthetic Student: A Machine Learning Model to Simulate MOOC Data", Massachusetts Institute of Technology, Master's Thesis, May 2015, 103 pages.

Xiao, "Towards Automatically Linking Data Elements", Massachusetts Institute of Technology, Master's Thesis, Jun. 2017, 92 pages.

Xu et al., "An Algorithm for Remote Sensing Image Classification Based on Artificial Immune B-Cell Network", The International Archives of the Photogrammetry, Remote Sensing and Spatial Information Sciences, vol. XXXVII, Part 86b, Beijing China, Jul. 3-11, 2008, 6 pages.

Zhao et al., "Semi-Supervised Multi-Label Learning with Incomplete Labels", 24th International Joint Conference on Artificial Intelligence, Buenos Aires, Argentina, Jul. 25-31, 2015, pp. 4062-4068.

* cited by examiner

COMPUTER-BASED REASONING SYSTEM FOR OPERATIONAL SITUATION CONTROL OF CONTROLLABLE SYSTEMS

BENEFIT CLAIM

The present application is a continuation of U.S. application Ser. No. 17/347,051 having a filing date of Jun. 14, 2021, which is a continuation-in-part of U.S. application Ser. No. 15/817,627 filed on Nov. 20, 2017. This application is also a continuation-in-part of U.S. patent application Ser. No. 17/346,901, filed on Jun. 14, 2021, which is in turn a continuation-in-part of U.S. patent application Ser. No. 17/333,671, filed May 28, 2021, which is in turn a continuation-in-part of U.S. patent application Ser. No. 17/038,955, filed Sep. 30, 2020, which is in turn a continuation-in-part of U.S. patent application Ser. No. 17/006,144, filed Aug. 28, 2020, which is in turn a continuation-in-part of U.S. patent application Ser. No. 16/713,714, filed Dec. 13, 2019, which is in turn a continuation-in-part of U.S. patent application Ser. No. 16/219,476, filed Dec. 13, 2018 and also claims priority to and the benefit of United States Provisional Patent Application No. 62/814,585, filed Mar. 6, 2019. U.S. patent application Ser. No. 17/038,955 and U.S. patent application Ser. No. 17/006,144 each claim priority to and the benefit of U.S. Provisional Patent Application No. 63/036,741 filed Jun. 9, 2020 and U.S. Provisional Patent Application No. 63/024,152 filed May 13, 2020. This application also claims priority to and the benefit of U.S. Provisional Patent Application No. 63/168,521 filed Mar. 31, 2021 and U.S. Provisional Patent Application No. 63/179,916 filed Apr. 26, 2021. Each of the applications identified above is hereby incorporated by reference herein in its entirety.

FIELD OF THE INVENTION

The present invention relates to computer-based reasoning systems for use in vehicle operations and in particular to computer-based reasoning systems for operational situation vehicle control.

BACKGROUND

Automated systems, such as vehicular assistance and vehicle automation, are becoming increasingly important. Numerous companies are working to automate system operations, and need to know how to automate these systems. This automation, in the context of automobiles cars, is sometimes called "self-driving" or "autonomous" control of vehicles. Generally, the technology frees the vehicles from needing constant direction from a human operator. An issue with vehicles controlled by this technology is, however, that the ride of the vehicles can feel silted, awkward, and uncomfortable for passengers, and can be hazardous for cargo and/or other vehicles sharing the air, road, water, etc. Further, operation of these vehicles can be unpleasant or hazardous even when a vehicle is obeying the laws and rules associated with its operation (e.g., driving within the speed limit, etc.). The same applies in the context of other controllable systems, such as in health care, manufacturing, smart control, federated systems, labelling, etc.

Operational situations can differ for controllable systems. In the context of automobiles, regions, cities, states, and geographies can have different standards (whether formal or informal) for vehicle operation, and these may vary based on factors such as road conditions and time of day. For example, there may be roads on which drivers normally drive near the speed limit except when summiting a particular hill at sunrise because of reduced visibility. In some locales, it is customary to stop before a crosswalk to allow a pedestrian to cross, and in others the unexpected stop might cause a collision. As another example, people may drive more slowly and cautiously when it rains or snows. Without accounting for these actions related to particular geographies, times, and conditions, a self-driving vehicle may not operate well in a given environment. The same is true for other system types. For example, in the context of healthcare, the standards may differ per geography (such as state or country), based on healthcare provider, etc.

The techniques described herein use data quality assessments to overcome one or more of these address these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The appended claims may serve as a summary of the invention.

DETAILED DESCRIPTION

Figure 1:
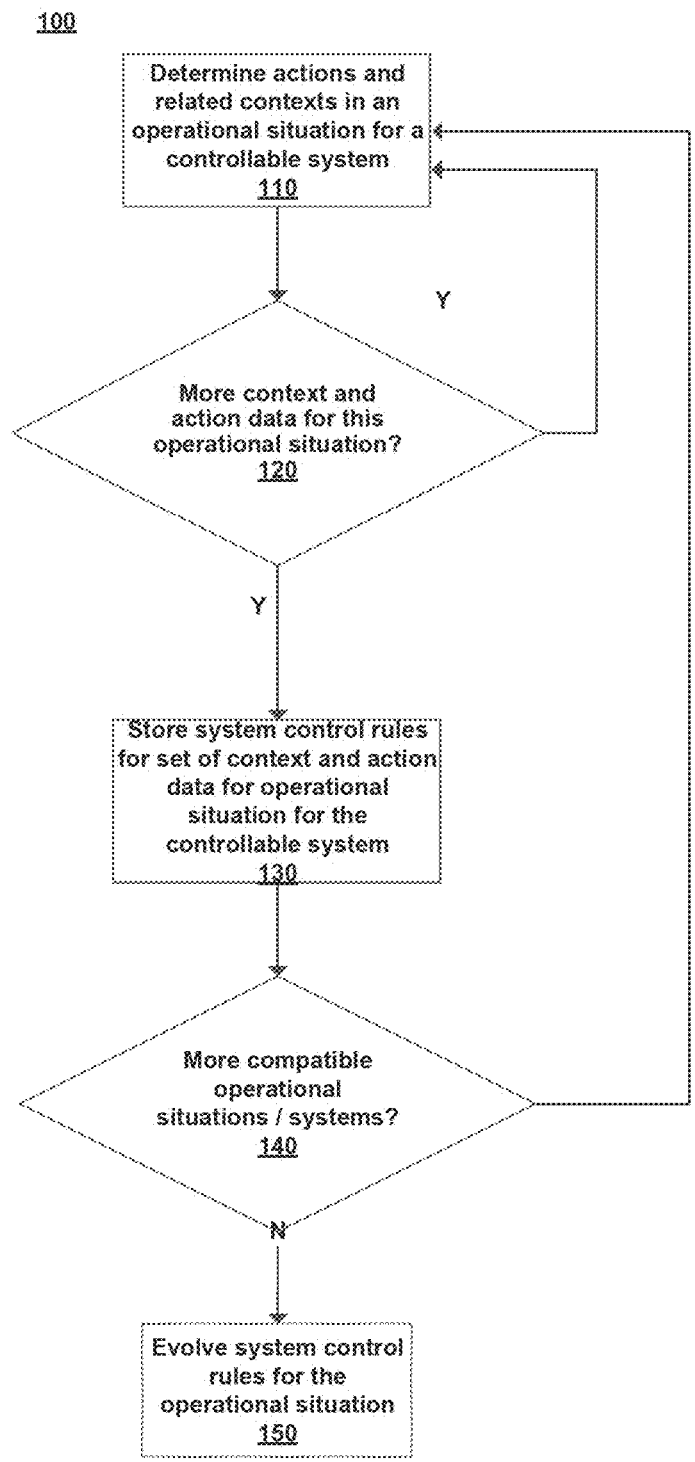
FIG. 1 depicts an example process for system control rule creation for use with computer-based reasoning systems for operational situation control of controllable systems.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

General Overview

There is a need for control of controllable systems that reflect the rules, conditions, and specifics of control of that system. For example, there is a need for self-driving car controls that obey local rules, adhere to specific conditions, etc. and, separately, can operate more like particular people. In some embodiments, the techniques herein collect data from the operation of vehicles by particular individuals, in particular geographies, at particular times, and in particular conditions (collectively, "operational situations"). This data can be used to improve the operation of the vehicle in those operational situations, match the operation of the vehicle to that of the individual, drive more like someone in that city, etc. As additional examples, health care decision making, such as outcome prediction, and fraud detection, and financial decision making, also must comply with norms and/or obey the local rules, laws, and standards (e.g., state, country, and federal). In some embodiments, the techniques herein collect data from the operation of health system (and financial and other controllable systems) by particular individuals, in particular geographies, at particular times, and in particular conditions (collectively, "operational situations").

Controlling operation of a system may include controlling that system like an entity for whom data was previously collected. For example, controlling operation of a vehicle in a similar operational situation might commence by someone (e.g., Alicia as operator or passenger) indicating that she would like to have the vehicle operate like it does when a particular person (again Alicia, e.g.) is driving. This might be beneficial when she is riding in the same (or a similar) vehicle again and would like it to more closely adhere to what she would do in particular situations during operation of the vehicle. If Alicia normally drives a few miles per hour below the speed limit in light congestion and follows at least two seconds behind cars, then the vehicle control rules (e.g., context-action pairs assuming a context-based reasoning system) will reflect that and the vehicle will drive a few miles per hour below the speed limit and follow at least two seconds behind other cars while she is in the car. The same would be true if another vehicle passenger, Bob indicates he would like the car to drive like Alicia. Alicia's driving data can even be used if there is no passenger. For example, if Alicia is an exemplary driver, unlikely to get in or cause accidents, and unlikely to jostle contents inside the vehicle, then it may be useful to have the vehicle drive like Alicia when it is carrying cargo, or even if it is empty and being navigated to a particular location.

As another example, the techniques used by drivers when approaching a red light or stop sign may differ considerably. For example, Carole may coast in and then brake at the last moment, while Alicia may slow down earlier and roll in. Alicia could be very uncomfortable if a vehicle approached a red light using Carole's technique, and vice versa. Therefore, the techniques herein may allow Alicia to have the car drive more like her, and likewise for Carole. As such, both may be more comfortable when riding in a self-driving vehicle using their own (or similar) driving data, versus using the data from the other, incompatible, person.

In some embodiments, context and action data from one or more operators of a system (or similar systems) are collected in the same or similar operational situations. Those multiple sets of context and action data are used for later operation of compatible systems (vehicles, manufacturing systems, health or financial systems, smart or federated systems, etc.). For example, turning to vehicular control, it may be useful to collect data from multiple vehicle operators within a particular geographical region, in certain weather conditions, etc., and/or to collect multiple sets of operation data for a single operator. Those sets of context and action data can be used together to create a joint profile for driving in the operational situations. In one embodiment, multiple sets of context and action data can be collected for a single operator (Alicia) and used together to control operation of a vehicle, thereby creating a denser or richer set of data for driving like Alicia. In another embodiment, operational data for multiple operators (and perhaps more than one set from each operator) may be collected in the same or similar operational situation, thereby creating a rich set of data for operating that vehicle in that operational situation (e.g., driving like a cautious delivery driver, driving at night, driving in a particular city, driving in the snow, etc.). In some embodiments, the current context can be compared with all the context-action pairs available, the one or the N context-action pairs with the closest distance from the current context may be chosen.

Further, some embodiments include evolving the data for an operational situation using evolutionary programming techniques. This evolution may include evolving context-action pairs within the set of context-action pairs for the operational situation and/or evolving the context-action pairs associated with the operational situation with those of a different operational situation.

In some embodiments, the operational situation may include preferences set by a user or operator. For example, turning to vehicular control, if Alicia likes to drive slowly along a certain section of road because of road conditions, then she can geofence that area and indicate that the vehicle should operate at a slower pace there. For example, the vehicle might operate using a conservatively-driving baseline program (or using a set of data associated with a "conservative driver" operational situation) within that geofenced area. Such preferences may be indicated on a graphical user interface, a configuration file, via spoken command, automatically learned or inferred over time, etc.

Various embodiments of the techniques herein include choosing an action to take based on a set of particular vehicle control rules associated with compatible operational situations. Those actions may be performed (or simulated) by a vehicle, a simulator, and/or a machine learning vehicle operations system.

Example Processes for Vehicle Control Rule Creation

Many of the examples herein refer to control of vehicular systems. Such examples apply to other controllable systems. For example, process 100 may be use for rule creation for health care decision making, prediction and fraud detection, control of energy transfer systems, control and automation of experiments, control of federated and smart devices, control of manufacturing and assembly systems, image labelling, real estate value and valuation prediction, cyber security, etc.

FIG. 1 depicts an example process 100 for control rule creation for use with computer-based reasoning systems for control of a controllable systems. Some embodiments of process 100 relate to the collection of context data and related action data for operating in a particular operational situation. In brief, the context and action data are determined 110. If there are more 120 context and actions being taken, then the process will continue to determine 110 context and action data. When there are no more 120 context and action data (e.g., if a vehicle has stopped operation), then the vehicle control rules for the set of contexts and action data are stored 130. In some embodiments (not depicted in FIG. 1), the contexts and actions are optionally processed (e.g., training a machine learning system with the set of context and action data, or using information attributed by the context and action in order to reduce the size of the set of context and action data) in order to determine the system control rules. In some embodiments, the system control rules are context-action pairs used in a context-based reasoning system. In some embodiments, the system control rules are trained neural networks. If there are more 140 compatible operation data, then the process returns to determining 110. If not, then the process 100 may optionally evolve 150 the system control data. Various embodiments, details, and examples are described herein.

Returning to the top of process 100, and in the context of controlling a controllable system such as a vehicle, the process proceeds by determining 110 actions and related contexts in an operational situation for a vehicle. In some embodiments, the context data may include data related to the operation of the vehicle, including the environment in which it is operating, and the actions taken may be of any granularity. Consider an example of data collected while a driver, Alicia, drives around a city. The collected data could be context and action data where the actions taken can include high-level actions (e.g., drive to next intersection, exit the highway, take surface roads, etc.), mid-level actions (e.g., turn left, turn right, change lanes) and/or low-level actions (e.g., accelerate, decelerate, etc.). The contexts can include any information related to the vehicle (e.g. time until impact with closest object(s), speed, course heading, breaking distances, vehicle weight, etc.), the driver (pupillary dilation, heart rate, attentiveness, hand position, foot position, etc.), the environment (speed limit and other local rules of the road, weather, visibility, road surface information, both transient such as moisture level as well as more permanent, such as pavement levelness, existence of potholes, etc.), traffic (congestion, time to a waypoint, time to destination, availability of alternate routes, etc.), and the like. These input data (e.g., context-action pairs for training a context-based reasoning system or input training contexts with outcome actions for training a machine learning system) can be saved and later used to help control a compatible vehicle in a compatible operational situation. The operational situation of the vehicle may include any relevant data related to the operation of the vehicle. In some embodiments, the operational situation may relate to operation of vehicles by particular individuals, in particular geographies, at particular times, and in particular conditions. For example, the operational situation may refer to a particular driver (e.g., Alicia or Carole). Alicia may be considered a cautious car driver, and Carole a faster driver. As noted above, and in particular, when approaching a stop sign, Carole may coast in and then brake at the last moment, while Alicia may slow down earlier and roll in. As another example of an operational situation, Bob may be considered the "best pilot" for a fleet of helicopters, and therefore his context and actions may be used for controlling self-flying helicopters.

In some embodiments, the operational situation may relate to the locale in which the vehicle is operating. The locale may be a geographic area of any size or type, and may be determined by systems that utilize machine learning. For example, an operational situation may be "highway driving" while another is "side street driving". An operational situation may be related to an area, neighborhood, city, region, state, country, etc. For example, one operational situation may relate to driving in Raleigh, NC and another may be driving in Pittsburgh, PA. An operational situation may relate to safe or legal driving speeds. For example, one operational situation may be related to roads with forty-five miles per hour speed limits, and another may relate to turns with a recommended speed of 20 miles per hour. The operational situation may also include aspects of the environment such as road congestion, weather or road conditions, time of day, etc. The operational situation may also include passenger information, such as whether to hurry (e.g., drive faster), whether to drive smoothly, technique for approaching stop signs, red lights, other objects, what relative velocity to take turns, etc. The operational situation may also include cargo information, such as weight, hazardousness, value, fragility of the cargo, temperature sensitivity, handling instructions, etc.

In some embodiments, the context and action determined 110 include vehicle maintenance information. The context may include information for timing and/or wear-related information for individual or sets of components. For example, the context may include information on the timing and distance since the last change of each fluid, each belt, each tire (and possibly when each was rotated), the electrical system, interior and exterior materials (such as exterior paint, interior cushions, passenger entertainment systems, etc.), communication systems, sensors (such as speed sensors, tire pressure monitors, fuel gauges, compasses, global positioning systems (GPS), RADARs, LiDARs, cameras, barometers, thermal sensors, accelerometers, strain gauges, noise/sound measurement systems, etc.), the engine(s), structural components of the vehicle (wings, blades, struts, shocks, frame, hull, etc.), and the like. The action taken may include inspection, preventative maintenance, and/or a failure of any of these components. As discussed elsewhere herein, having context and actions related to maintenance may allow the techniques to predict when issues will occur with future vehicles and/or suggest maintenance. For example, the context of an automobile may include the distance traveled since the timing belt was last replaced. The action associated with the context may include inspection, preventative replacement, and/or failure of the timing belt. Further, as described elsewhere herein, the contexts and actions may be collected for multiple operators and/or vehicles. As such, the timing of inspection, preventative maintenance and/or failure for multiple automobiles may be determined 110 and later used for predictions and messaging.

In some embodiments, the system 300 may perform the process 100, including determining 110 context and action data. For example, vehicle operational analysis system 310 may determine 110 actions and contexts for an operational situation for a vehicle 350-353. In some embodiments, the contexts and actions may be determined 110 based on a simulation 360 of a vehicle.

If there are more 120 context and action data related to the vehicle operation (e.g., the vehicle is still operating, and training data is still being recorded), then the process returns to determining 110, and otherwise stores 130 vehicle control rules for the set of context and action data that has been determined 110.

In some embodiments, storing 130 the vehicle control rules comprise storing the determined 110 contexts and actions as context-action pairs for use in a context based reasoning system. For example, in the context of system 300, vehicle operation analysis system 310 may store 130 the vehicle control rules locally, in storage 330 and/or 340, at vehicle control 320, and/or elsewhere.

In some embodiments, the context and action data are processed before being stored 130 (not depicted in FIG. 1). In embodiments using context-based reasoning systems, the set of context-action pairs may be reduced before storing 130 them (not depicted in FIG. 1), including only those that provide a sufficient amount of "extra" information. E.g., if a set of context-action pairs for Alicia or Carole includes much data related to driving at a constant speed on the highway, and relatively less data related to traversing railroad tracks, then the set of context-action pairs may be culled of some of the context-action pairs related to driving at a constant speed on the highway. This may reduce the total amount of memory needed to store the vehicle control rules, and the processing data needed to later process the vehicle control rules for operation of a vehicle. In some embodiments, multiple sets of context-action pairs may be stored 130 together as a single set of vehicle control rules. The multiple sets of context-action pairs may also be stored 130 separately and later mixed or combined for use as the vehicle control rules.

Additional examples of processing the context and action data before storing 130 the vehicle control rules include training a machine learning system to determine the vehicle control rules (not depicted in FIG. 1). The context data (input) and action data (outcome) may be used as training data in the machine learning system in order to produce a feed forward neural network, convolutional neural network, deep neural network, radial basis function neural network, self-organizing neural network, recurrent neural network, modular neural network, and/or other vehicle control rules as appropriate. The trained neural network can then serve as the vehicle control rules and be stored 130.

As noted above, in various embodiments, storing 130 the vehicle control rules together may include combining the vehicle control rules of multiple operators in order to make a combined vehicle control rule set for that set of operators. This may be useful if there are multiple operators or trainers for a particular area, neighborhood, city, region, state, country, etc. By combining and/or evolving the multiple operations vehicle control rules, the embodiments can produce sets of vehicle control rules for that area, neighborhood, city, region, state, country, etc. For example, driving data from multiple training runs each of five drivers in Raleigh may be combined to create a profile for driving in Raleigh. The driving data for traversing a particular portion of a road (e.g., one that has challenging geography or road conditions) may be combined from multiple drivers and/or multiple driving sessions of those drivers in order to obtain a set of vehicle control rules for driving over that particular portion of road. Further, sets of context and action data can be combined from over larger areas, neighborhoods, cities, regions, states, countries, etc. This may be useful to create vehicle control rules for those larger areas.

There may be multiple vehicle operators or vehicles for a given operational situation, and context and action data for each may be determined 110 and stored 130 in parallel and/or in serial with the others. At any given time, if there are more 140 compatible operational situations and/or vehicles, then process 100 will determine 110 contexts and actions for those operations of the vehicles. For example, if Alicia has done one training run, and is performing more training runs (using the same or a different vehicle), then the process 100 will determine 110 contexts and actions and store 130 vehicle control rules for Alicia's subsequent training sessions.

For sets of context and action data to be used together to create vehicle control rules, the vehicles and the operational situations need only be compatible, not necessarily identical. Compatibility, in various embodiments and as discussed elsewhere, can be based on geography, based on similarity of driving style, identity of the vehicle operator, etc. For example, the compatibility of the operational situations among sets of vehicle control rules could be that all the operators of the vehicles are professional delivery drivers. Additionally, each operator does not necessarily need to be in the same vehicle, or even the same model of vehicle. For example, compatible vehicles may be based on all being land-based (or water- or air-based) vehicles, all being vehicles over (and/or under) a certain weight or size, having a certain number of wheels, etc.

If there are no more 140 context and action data for compatible operational situations, then the vehicles control rules may, optionally be evolved 150. Examples of evolving 150 the vehicle control rules are discussed elsewhere herein.

Many examples herein refer to human operators driving or piloting vehicles, but numerous other training data may be used. For example, a simulator 360 (of FIG. 3) may run and the data from that run may be used in process 100. Further, multiple vehicles of multiple types may be used to determine vehicle control rules that are stored 130. Generally, only compatible vehicles being operated in compatible operational situations may be used together. Note, however, that the compatibility of vehicles and operational situations may be different in different embodiments and for different desired outcomes. For example, all two and four door sedans may be considered compatible for one embodiment (e.g., vs minivans, helicopters, boats, etc.) but in another embodiment, only those vehicles sharing certain characteristics such as top speed, breaking distance, interior size, and the like may be considered compatible.

Process 100 depicts context and action data being determined 110, and vehicle control rules being stored 130 for a single operational situation. In some embodiments, process 100, or another process not depicted in FIG. 1, may be collecting data for multiple operational situation, and these operational situations, at different times and for different uses, may or may not be considered compatible. For example, a set of context and action data taken in the operational situation of "driving in Raleigh" may be considered incompatible with an operational situation of "driving in Pittsburgh" when the compatibility is being measured at the city or state level. If, however, the compatibility is being measured as "driving in the continental United States", then the driving in Raleigh and Pittsburgh would be considered compatible.

Example Processes for System Control

Figure 2:
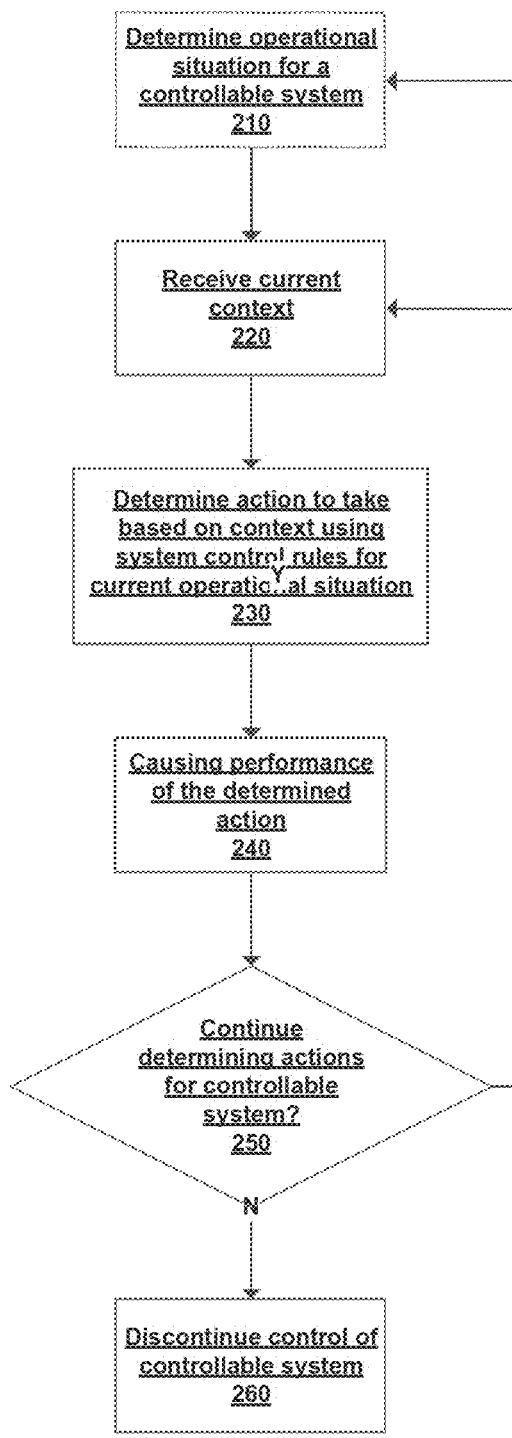
FIG. 2 depicts an example process for system control with computer-based reasoning systems for operational situation control of controllable systems.

FIG. 2 depicts an example process 200 for control with computer-based reasoning systems for operational situation control of controllable systems. In some embodiments and at a high level, the process 200 proceeds by receiving or determining 210 an operational situation in which a controllable system is operating or will operate, and that information may be used to determine which system control rules to use. In some embodiments, the process 200 proceeds by receiving 220 a current context, determining 230 an action to take based on the context and the system control rules, and causing 240 performance of the determined action (e.g., for a vehicle, causing a vehicle to perform the turn, lane change, waypoint navigation, etc.). If operation of the system continues 250, then the process returns to determine 210 the operational situation or receive 220 the current context, and otherwise discontinues 260 autonomous control of the controllable system.

In some embodiments, and in the context of control of a controllable vehicle, the process 200 optionally starts with a determination 210 of the operational situation in which a vehicle is operating. The operational situation could be indicated by a passenger or operator of the vehicle, by a configuration file, a setting, and/or the like. For example, a passenger Alicia may select "drive like Alicia" in order to have the vehicle driver like her. As another example, a fleet of helicopters may have a configuration file set to operate like Bob. In some embodiments, the operational situation may be detected. For example, the vehicle may detect that it is operating in a particular location (area, city, region, state, or country), time of day, weather condition, etc. and the vehicle may be indicated to drive in a manner appropriate for that operational situation.

The operational situation, whether detected, indicated by passenger, etc., may be changed during operation of the vehicle. For example, a passenger may first indicate that she would like the vehicle to drive cautiously (e.g., like Alicia), and then realize that she is running later and switch to a faster operation mode (e.g., like Carole). The operational situation may also change based on detection. For example, if a vehicle is operating under an operational situation for a particular portion of road, and detects that it has left that portion of road, it may automatically switch to an operational situation appropriate for its location (e.g., for that city), may revert to a default operation (e.g., a baseline program that operates the vehicle) or operational situation (e.g., the last used). In some embodiments, if the vehicle detects that it needs to change operational situations, it may prompt a passenger or operator to choose a new operational situation.

In some embodiments, the operational situation is predetermined before process 200 begins, and the process begins by receiving the current context. For example, the vehicle control rules for the operational situation may already be loaded into a vehicle controller and the process 200 begins by receiving 220 the current context. In other embodiments, the vehicle control rules for operating the vehicle can be chosen based on the determined 210 operational situation and then receiving 220 current context information for the vehicle.

Figure 3:
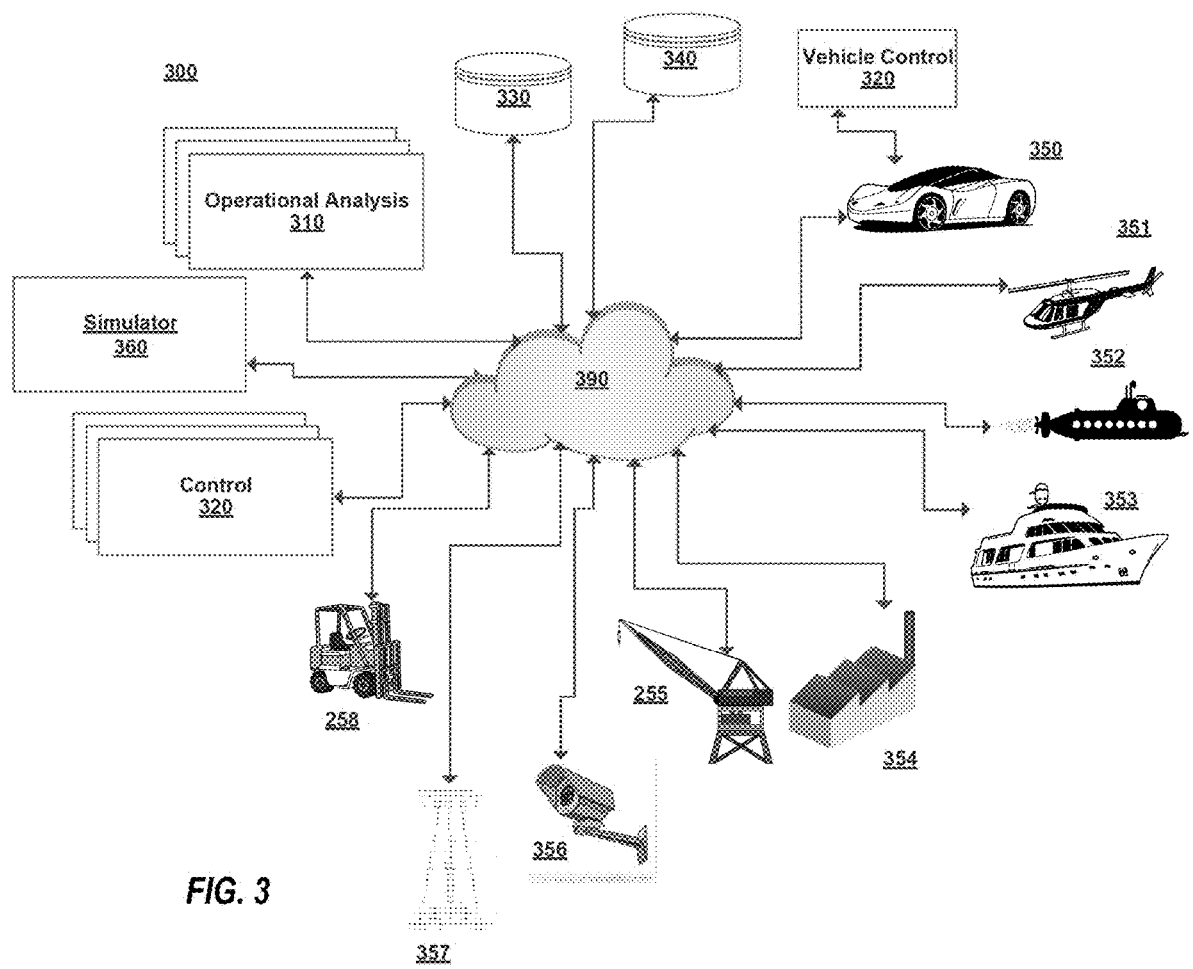
FIG. 3 depicts example systems for computer-based reasoning systems for operational situation control of controllable systems.

In some embodiments, referring to FIG. 3, the current context may be determined 210 for a vehicle 350-353, and the vehicle control 320 may receive 220 current context information about a vehicle 350-353.

Receiving 220 the current context may, in various embodiments, include receiving information from sensors on or near the vehicle, determining information based on location or other sensor information, accessing data about the vehicle or location, etc. For example, the vehicle may have numerous sensors related to the vehicle and its operation, such as one or more of each of the following: speed sensors, tire pressure monitors, fuel gauges, compasses, global positioning systems (GPS), RADARs, LiDARs, cameras, barometers, thermal sensors, accelerometers, strain gauges, noise/sound measurement systems, etc. Current context may also include information determined based on sensor data. For example, the time to impact with the closest object may be determined based on distance calculations from RADAR or LiDAR data, and/or may be determined based on depth-from-stereo information from cameras on the vehicle. Context may include characteristics of the sensors, such as the distance a RADAR or LiDAR is capable of detecting, resolution and focal length of the cameras, etc. Context may include information about the vehicle not from a sensor. For example, the weight of the vehicle, acceleration, deceleration, and turning or maneuverability information may be known for the vehicle and may be part of the context information. Additionally, context may include information about the location, including road condition, wind direction and strength, weather, visibility, traffic data, road layout, etc.

Referring back to the example of vehicle control rules for Bob flying a helicopter, the context data for a later flight of the helicopter using the vehicle control rules based on Bob's operation of the helicopter may include fuel remaining, distance that fuel can allow the helicopter to travel, location including elevation, wind speed and direction, visibility, location and type of sensors as well as the sensor data, time to impact with the N closest objects, maneuverability and speed control information, etc. Returning to the stop sign example, whether using vehicle control rules based on Alicia or Carole, the context may include LiDAR, RADAR, camera and other sensor data, location information, weight of the vehicle, road condition and weather information, braking information for the vehicle, etc.

An action to take is determined 230 based on the current context and the vehicle control rules for the current operational situation. In some embodiments that use machine learning, the vehicle control rules may be in the form of a neural network (as described elsewhere herein), and the context may be fed into the neural network to determine an action to take. In embodiments using case-based reasoning, the set of context-action pairs closest to the current context may be determined. In some embodiments, only the closest context-action pair is determined, and the action associated with that context-action pair is the determined 230 action. In some embodiments, multiple context-action pairs are determined 230. For example, the N "closest" context-action pairs may be determined 230, and either as part of the determining 230, or later as part of the causing 240 performance of the action, choices may be made on the action to take based on the N closest context-action pairs, where "distance" for between the current context can be measured using any appropriate technique, including use of Euclidean distance, Minkowski distance, Damerau-Levenshtein distance, Kullback-Leibler divergence, and/or any other distance measure, metric, psuedometric, premetric, index, or the like.

In some embodiments, the actions to be taken may be blended based on the action of each context-action pair, with invalid (e.g., impossible or dangerous) outcomes being discarded. A choice can also be made among the N context-action pairs chosen based on criteria such as choosing to use the same or different operator context-action pair from the last determined action. For example, in an embodiment where there are context-action pair sets from multiple operators in the vehicle control rules, the choice of which context-action pair may be based on whether a context-action pair from the same operator was just chosen (e.g., to maintain consistency). The choice among the top N context-action pairs may also be made by choosing at random, mixing portions of the actions together, choosing based on a voting mechanism, etc.

Some embodiments include detecting gaps in the training data and/or vehicle control rules and indicating those during operation of the vehicle (for example, via prompt and/or spoken or graphical user interface) or offline (for example, in a report, on a graphical display, etc.) to indicate what additional training is needed (not depicted in FIG. 2). In some embodiments, when the computer-based reasoning system does not find context "close enough" to the current context to make a confident decision on an action to take, it may indicate this and suggest that an operator might take manual control of the vehicle, and that operation of the vehicle may provide additional context and action data for the computer-based reasoning system. Additionally, in some embodiments, an operator may indicate to a vehicle that she would like to take manual control to either override the computer-based reasoning system or replace the training data. These two scenarios may differ by whether the data (for example, context-action pairs) for the operational scenario are ignored for this time period, or whether they are replaced.

In some embodiments, the operational situation may be chosen based on a confidence measure indicating confidence in candidate actions to take from two (or more) different sets of control rules (not depicted in FIG. 2). Consider a first operational situation associated with a first set of vehicle control rules (e.g., with significant training from Alicia driving on highways) and a second operational situation associated with a second set of vehicle control rules (e.g., with significant training from Carole driving on rural roads). Candidate actions and associated confidences may be determined for each of the sets of vehicle control rules based on the context. The determined 230 action to take may then be selected as the action associated with the higher confidence level. For example, when the vehicle is driving on the highway, the actions from the vehicle control rules associated with Alicia may have a higher confidence, and therefore be chosen. When the vehicle is on rural roads, the actions from the vehicle control rules associated with Carole may have higher confidence and therefore be chosen. Relatedly, in some embodiments, a set of vehicle control rules may be hierarchical, and actions to take may be propagated from lower levels in the hierarchy to high levels, and the choice among actions to take propagated from the lower levels may be made on confidence associated with each of those chosen actions. The confidence can be based on any appropriate confidence calculation including, in some embodiments, determining how much "extra information" in the vehicle control rules is associated with that action in that context.

In some embodiments, there may be a background or baseline operational program that is used when the computer-based reasoning system does not have sufficient data to make a decision on what action to take (not depicted in FIG. 2). For example, if in a set of vehicle control rules, there is no matching context or there is not a matching context that is close enough to the current context, then the background program may be used. If none of the training data from Alicia included what to do when crossing railroad tracks, and railroad tracks are encountered in later operation of the vehicle, then the system may fall back on the baseline operational program to handle the traversal of the railroad tracks. In some embodiments, the baseline model is a computer-based reasoning system, in which case context-action pairs from the baseline model may be removed when new training data is added. In some embodiments, the baseline model is an executive driving engine which takes over control of the vehicle operation when there are no matching contexts in the vehicle control rules (e.g., in the case of a context-based reasoning system, there might be no context-action pairs that are sufficiently "close").

In some embodiments, determining 230 an action to take based on the context can include determining whether vehicle maintenance is needed. As described elsewhere herein, the context may include wear and/or timing related to components of the vehicle, and a message related to maintenance may be determined based on the wear or timing. The message may indicate that maintenance may be needed or recommended (e.g., because preventative maintenance is often performed in the timing or wear context, because issues have been reported or detected with components in the timing or wear context, etc.). The message may be sent to or displayed for a vehicle operator (such as a fleet management service) and/or a passenger. For example, in the context of an automobile with sixty thousand miles, the message sent to a fleet maintenance system may include an indication that a timing belt may need to be replaced in order to avoid a P percent chance that the belt will break in the next five thousand miles (where the predictive information may be based on previously-collected context and action data, as described elsewhere herein). When the automobile reaches ninety thousand miles and assuming the belt has not been changed, the message may include that the chance that the belt will break has increased to, e.g., P*4 in the next five thousand miles.

Performance of the determined 230 action is then caused 240. Causing 240 performance of the action may include direct control of the vehicle and/or sending a message to a system, device, or interface that can control the vehicle. The action sent to control the vehicle may also be translated before it is used to control the vehicle. For example, the action determined 230 may be to navigate to a particular waypoint. In such an embodiment, causing 240 performance of the action may include sending the waypoint to a navigation system, and the navigation system may then, in turn, control the vehicle on a finer-grained level. In other embodiments, the determined 230 action may be to switch lanes, and that instruction may be sent to a control system that would enable the car to change the lane as directed. In yet other embodiments, the action determined 230 may be lower-level (e.g., accelerate or decelerate, turn 2° to the left, etc.), and causing 240 performance of the action may include sending the action to be performed to a control of the vehicle 350-353, or controlling the vehicle 350-353 directly. In some embodiments, causing 240 performance of the action includes sending one or more messages for interpretation and/or display. In some embodiments, the causing 240 the action includes indicating the action to be taken at one or more levels of a control hierarchy for a vehicle. Examples of control hierarchies are given elsewhere herein.

Some embodiments include detecting anomalous actions taken or caused 240 to be taken. These anomalous actions may be signaled by an operator or passenger, or may be detected after operation of the vehicle (e.g., by reviewing log files, external reports, etc.). For example, a passenger of a vehicle may indicate that an undesirable maneuver was made by the vehicle (e.g., turning left from the right lane of a 2-lane road) or log files may be reviewed if the vehicle was in an accident. Once the anomaly is detected, the portion of the vehicle control rules (e.g., context-action pair(s)) related to the anomalous action can be determined. If it is determined that the context-action pair(s) are responsible for the anomalous action, then those context-action pairs can be removed or replaced using the techniques herein.

Referring to the example of the helicopter 351 fleet and the vehicle control rules associated with Bob, the vehicle control 320 may determine 230 what action to take for the helicopter 351 based on the received 220 context. The vehicle control 320 may then cause the helicopter 351 to perform the determined action, for example, by sending instructions related to the action to the appropriate controls in the helicopter 351. In the driving example, the vehicle control 320 may determine 230 what action to take based on the context of vehicle 350. The vehicle control may then cause 240 performance of the determined 230 action by the automobile 350 by sending instructions to control elements on the vehicle 351.

As long as there is a continuation of operation of the vehicle using the vehicle control rules, the process 200 returns to receive 220 the subsequent current context for the vehicle. If the operational situation changes (e.g., the automobile 350 is no longer on the stretch of road associated with the operational situation, a passenger indicates a new operational situation, etc.), then the process returns to determine 210 the new operational situation.

If the vehicle is no longer operating under vehicle control rules (e.g., it arrived at its destination, a passenger took over manual control, etc.), then the process 200 will discontinue 260 autonomous control of the vehicle.

As discussed herein the various processes 100, 200, etc. may run in parallel, in conjunction, together, or one process may be a subprocess of another. Further, any of the processes may run on the systems or hardware discussed herein. Many of the examples discussed herein for vehicles discuss self-driving automobiles. As depicted in FIG. 3, numerous types of vehicles can be controlled. For example, a helicopter 351 or drone, a submarine 352, or boat or freight ship 353, or any other type of vehicle such as plane or drone (not depicted in FIG. 2), construction equipment, (not depicted in FIG. 2), and/or the like. In each case, the computer-based reasoning model may differ, including using different features, using different techniques described herein, etc. Further, the context of each type of vehicle may differ. Flying vehicles may need context data such as weight, lift, drag, fuel remaining, distance remaining given fuel, windspeed, visibility, etc. Floating vehicles, such as boats, freight vessels, submarines, and the like may have context data such as buoyancy, drag, propulsion capabilities, speed of currents, a measure of the choppiness of the water, fuel remaining, distance capability remaining given fuel, and the like. Manufacturing and other equipment may have as context width of area traversing, turn radius of the vehicle, speed capabilities, towing/lifting capabilities, and the like.

Image Labelling

The techniques herein may also be used for image-labeling systems. For example, numerous experts may label images (e.g., identifying features of or elements within those images). For example, the human experts may identify cancerous masses on x-rays. Having these experts label all input images is incredibly time consuming to do on an ongoing basis, in addition to being expensive (paying the experts). The techniques herein may be used to train an image-labeling computer-based reasoning model based on previously-trained images. Once the image-labeling computer-based reasoning system has been built, then input images may be analyzed using the image-based reasoning system. In order to build the image-labeling computer-based reasoning system, images may be labeled by experts and used as training data. Using the techniques herein, the training data can be used to build control rules. Once the image-labelling control rules are created, those rules can be used to label images in the future. Further, those images can be labelled like one or more particular image labelers. For example, a new image may come in, the image-labelling computer-based reasoning may determine one or more labels for the image based on the rules created with respect to one or more particular image labelers, and then the one or more labels may then be applied to the image. Thus, these images can be labeled automatically, like one or more previous image labelers, saving the time and expense related to having those experts label the images.

In some embodiments, processes 100, 200 may include determining the surprisal and/or conviction of each image (or multiple images) and the associated labels or of the aspects of the computer-based reasoning model. The surprisal and/or conviction for the one or more images may be determined and a determination may be made whether to select or include the one or more images (or aspects) in the image-labeling computer-based reasoning model based on the determined surprisal and/or conviction. While there are more sets of one or more images with labels to assess, the process may return to determine whether more image or label sets should be included or whether aspects should be included and/or changed in the model. Once there are no more images or aspects to consider, the process can turn to controlling the image analysis system using the image-labeling computer-based reasoning.

In some embodiments, process 100 may determine control rules for an operational situation for use in the image-labeling computer-based reasoning model. Based on a model that uses the data, the process can cause 240 control of an image-labeling system using process 200. For example, if the data elements are related to images and labels applied to those images, then the image-labeling computer-based reasoning model trained on that data will apply labels to incoming images. Process 200 proceeds by receiving 210 an image-labeling computer-based reasoning model (such as system control rules in an operational situation). The process proceeds by receiving 220 an image for labeling. The image-labeling computer-based reasoning model is then used to determine 230 labels for the input image. The image is then labeled 240. If there are more 250 images to label, then the system returns to receive 210 operational situations or 220 images, and otherwise ceases 260. In such embodiments, the image-labeling computer-based reasoning model may be used to select labels based on which training image is "closest" (or most similar) to the incoming image. The label(s) associated with that image will then be selected to apply to the incoming image.

Manufacturing and Assembly

The processes 100, 200 may also be used for manufacturing and/or assembly. For example, conviction can be used to identify normal behavior versus anomalous behavior of such equipment. Using the techniques herein, a crane (e.g., crane 355 of FIG. 3), robot arm, or other actuator is attempting to "grab" something and its surprisal is too high, it can stop, sound an alarm, shutdown certain areas of the facility, and/or request for human assistance. Anomalous behavior that is detected via conviction among sensors and actuators can be used to detect when there is a breakdown, unusual wear or mechanical or other malfunction, etc. It can also be used to find damaged equipment for repairs or buffing or other improvements for any robots or other machines that are searching and correcting defects in products or themselves (e.g., fixing a broken wire or smoothing out cuts made to the ends of a manufactured artifact made via an extrusion process). Conviction can also be used for cranes and other grabbing devices to find which cargo or items are closest matches to what is needed. Conviction can be used to drastically reduce the amount of time to train a robot to perform a new task for a new product or custom order, because the robot will indicate the aspects of the process it does not understand and direct training towards those areas and away from things it has already learned. Combining this with stopping ongoing actions when an anomalous situation is detected would also allow a robot to begin performing work before it is fully done training, the same way that a human apprentice may help out someone experienced while the apprentice is learning the job. Conviction can also inform what features or inputs to the robot are useful and which are not.

As an additional example in the manufacturing or assembly context, vibration data can be used to diagnose (or predict) issues with equipment. In some embodiments, the training data for the computer-based reasoning system would be vibration data (e.g., the output of one or more piezo vibration sensors attached to one or more pieces of manufacturing equipment) for a piece of equipment along with diagnosis of an issue or error that occurred with the equipment. The training data may similarly include vibration data for the manufacturing equipment that is not associated with an issue or error with the equipment. In subsequent operation of the same or similar equipment, the vibration data can be collected, and the computer-based reasoning model can be used to assess that vibration data to either diagnose or predict potential issues or errors with the equipment. For example, the vibration data for current (or recent) operation of one or more pieces of equipment, the computer-based reasoning model may be used to predict, diagnose, or otherwise determine issues or errors with the equipment. As a more specific example, a current context of vibration data for one or more pieces of manufacturing equipment may result in a diagnosis or prediction of various conditions, including, but not limited to: looseness of a piece of equipment (e.g., a loose screw), an imbalance on a rotating element (e.g., grime collected on a rotating wheel), misalignment or shaft runout (e.g., machine shafts may be out of alignment or not parallel), wear (e.g., ball or roller bearings, drive belts or gears become worn, they might cause vibration). As a further example, misalignment can be caused during assembly or develop over time, due to thermal expansion, components shifting or improper reassembly after maintenance. When a roller or ball bearing becomes pitted, for instance, the rollers or ball bearing will cause a vibration each time there is contact at the damaged area. A gear tooth that is heavily chipped or worn, or a drive belt that is breaking down, can also produce vibration. Diagnosis or prediction of the issue or error can be made based on the current or recent vibration data, and a computer-based reasoning model training data from the previous vibration data and associated issues or errors. Diagnosing or predicting the issues of vibration can be especially important where the vibration can cause other issues. For example, wear on a bearing may cause a vibration that then loosens another piece of equipment, which then can cause other issues and damage to equipment, failure of equipment, and even failure of the assembly or manufacturing process.

In some embodiments, techniques herein may determine (e.g., in response to a request) the surprisal and/or conviction of one or more data elements (e.g., of the manufacturing equipment) or aspects (e.g., features of context-action pairs or aspects of the model) to potentially include in the manufacturing control computer-based reasoning model. The surprisal and/or conviction for the one or more manufacturing elements may be determined and a determination may be made whether to select or include the one or more manufacturing data elements or aspects in the manufacturing control computer-based reasoning model based on the determined surprisal and/or conviction. While there are more sets of one or more manufacturing data elements or aspects to assess (e.g., from additional equipment and/or from subsequent time periods), the process may return to determine whether more manufacturing data elements or aspects sets should be included in the computer-based reasoning model. Once there are no more manufacturing data elements or aspects to consider for inclusion, the process can turn to controlling or causing control of the manufacturing system using the manufacturing control computer-based reasoning system.

In some embodiments, process 100 may determine control rules for an operational situation for use in the manufacturing control computer-based reasoning model. Based on a model (such as system control rules in a particular operational situation), causing 240 control of a manufacturing system may be accomplished by process 200. For example, if the data elements are related to manufacturing data elements or aspects, then the manufacturing control computer-based reasoning model trained on that data will cause control manufacturing or assemble (e.g., the data of chosen equipment, operators, etc.). Process 200 proceeds by receiving 210 a manufacturing control computer-based reasoning model (e.g., as system control rules). The process proceeds by receiving 220 a context. The manufacturing control computer-based reasoning model is then used to determine 230 an action to take. The action is then performed by the control system (e.g., caused by the manufacturing control computer-based reasoning system using the relevant system control rules). If there are more 250 contexts to consider, then the system returns to determine 210 operational situations or receive 220 those contexts and otherwise ceases 260. In such embodiments, the manufacturing control computer-based reasoning model may be used to control a manufacturing system. The chosen actions are then performed by a control system.

Smart Voice Control

The processes 100, 200 may be used for smart voice control. For example, combining multiple inputs and forms of analysis, the techniques herein can recognize if there is something unusual about a voice control request. For example, if a request is to purchase a high-priced item or unlock a door, but the calendar and synchronized devices indicate that the family is out of town, it could send a request to the person's phone before confirming the order or action; it could be that an intruder has recorded someone's voice in the family or has used artificial intelligence software to create a message and has broken in. It can detect other anomalies for security or for devices activating at unusual times, possibly indicating some mechanical failure, electronics failure, or someone in the house using things abnormally (e.g., a child frequently leaving the refrigerator door open for long durations). Combined with other natural language processing techniques beyond sentiment analysis, such as vocal distress, a smart voice device can recognize that something is different and ask, improving the person's experience and improving the seamlessness of the device into the person's life, perhaps playing music, adjusting lighting, or HVAC, or other controls. The level of confidence provided by conviction can also be used to train a smart voice device more quickly as it can ask questions about aspects of its use that it has the least knowledge about. For example: "I noticed usually at night, but also some days, you turn the temperature down in what situations should I turn the temperature down? What other inputs (features) should I consider?"

Using the techniques herein, a smart voice device may also be able to learn things it otherwise may not be able to. For example, if the smart voice device is looking for common patterns in any of the aforementioned actions or purchases and the conviction drops below a certain threshold, it can ask the person if it should take on a particular action or additional autonomy without prompting, such as "It looks like you're normally changing the thermostat to colder on days when you have your exercise class, but not on days when it is cancelled; should I do this from now on and prepare the temperature to your liking?"

In some embodiments, processes 100, 200 may include determining (e.g., in response to a request) the surprisal and/or conviction of one or more data elements (e.g., of the smart voice system) or aspects (e.g., features of the data or parameters of the model) to potentially include in the smart voice system control computer-based reasoning model. The surprisal for the one or more smart voice system data elements or aspects may be determined and a determination may be made whether to include the one or more smart voice system data elements or aspects in the smart voice system control computer-based reasoning model based on the determined surprisal and/or conviction. While there are more sets of one or more smart voice system data elements or aspects to assess, the process may return to determine whether more smart voice system data elements or aspects sets should be included. Once there are no more smart voice system data elements or aspects to consider, the process can turn to controlling or causing control of the smart voice system using the smart voice system control computer-based reasoning model.

In some embodiments, process 100 may determine control rules for an operational situation for use in the smart voice computer-based reasoning model. Based on a model, such as system control rules, the process can cause 240 control of a smart voice system using process 200. For example, if the data elements are related to smart voice system actions, then the smart voice system control computer-based reasoning model trained on that data will control smart voice systems. Process 200 proceeds by receiving 210 a smart voice computer-based reasoning model (such as system control rules in a particular operational situation). The process proceeds by receiving 220 a context. The smart voice computer-based reasoning model (such as system control rules in a particular operational situation) is then used to determine 230 an action to take. The action is then performed by the control system (e.g., caused by the smart voice computer-based reasoning system). If there are more 250 contexts to consider, then the system returns to determine 210 operational situations or receive 220 those contexts and otherwise ceases 260. In such embodiments, the smart voice computer-based reasoning model may be used to control a smart voice system. The chosen actions are then performed by a control system.

Control of Federated Devices

The processes 100, 200 may also be used for federated device systems. For example, combining multiple inputs and forms of analysis, the techniques herein can recognize if there is something that should trigger action based on the state of the federated devices. For example, if the training data includes actions normally taken and/or statuses of federated devices, then an action to take could be an often-taken action in the certain (or related contexts). For example, in the context of a smart home with interconnected heating, cooling, appliances, lights, locks, etc., the training data could be what a particular user does at certain times of day and/or in particular sequences. For example, if, in a house, the lights in the kitchen are normally turned off after the stove has been off for over an hour and the dishwasher has been started, then when that context again occurs, but the kitchen light has not been turned off, the computer-based reasoning system may cause an action to be taken in the smart home federated systems, such as prompting (e.g., audio) whether the user of the system would like the kitchen lights to be turned off. As another example, training data may indicate that a user sets the house alarm and locks the door upon leaving the house (e.g., as detected via geofence). If the user leaves the geofenced location of the house and has not yet locked the door and/or set the alarm, the computer-based reasoning system may cause performance of an action such as inquiring whether it should lock the door and/or set an alarm. As yet another example, in the security context, the control may be for turning on/off cameras, or enact other security measures, such as sounding alarms, locking doors, or even releasing drones and the like. Training data may include previous logs and sensor data, door or window alarm data, time of day, security footage, etc. and when security measure were (or should have been) taken. For example, a context such as particular window alarm data for a particular basement window coupled with other data may be associated with an action of sounding an alarm, and when a context occurs related to that context, an alarm may be sounded.

In some embodiments, processes 100, 200 may include determining the surprisal and/or conviction of one or more data elements or aspects of the federated device control system for potential inclusion in the federated device control computer-based reasoning model. The surprisal for the one or more federated device control system data elements may be determined and a determination may be made whether to select or include the one or more federated device control system data elements in the federated device control computer-based reasoning model based on the determined surprisal and/or conviction. While there are more sets of one or more federated device control system data elements or aspects to assess, the process may return to determine whether more federated device control system data elements or aspect sets should be included. Once there are no more federated device control system data elements or aspects to consider, the process can turn to controlling or causing control of the federated device control system using the federated device control computer-based reasoning model.

In some embodiments, process 100 may determine control rules for an operational situation for use in the federated device computer-based reasoning model. Based on a model, such as system control rules, the process can cause 240 control of a federated device system using process 200. For example, if the data elements are related to federated device system actions, then the federated device control computer-based reasoning model (such as system control rules in a particular operational situation) trained on that data will control federated device control system. Process 200 proceeds by receiving 210 a federated device control computer-based reasoning model. The process proceeds by receiving 220 a context. The federated device control computer-based reasoning model is then used to determine 230 an action to take. The action is then performed by the control system (e.g., caused by the federated device control computer-based reasoning system). If there are more 250 contexts to consider, then the system returns to determine 210 operational situations or receive 220 those contexts and otherwise ceases 260. In such embodiments, the federated device control computer-based reasoning model may be used to control federated devices. The chosen actions are then performed by a control system.

Control and Automation of Experiments

The processes 100, 200 may also be used to control laboratory experiments. For example, many lab experiments today, especially in the biological and life sciences, but also in agriculture, pharmaceuticals, materials science and other fields, yield combinatorial increases, in terms of numbers, of possibilities and results. The fields of design of experiment, as well as many combinatorial search and exploration techniques are currently combined with statistical analysis. However, conviction-based techniques such as those herein can be used to guide a search for knowledge, especially if combined with utility or fitness functions. Automated lab experiments (including pharmaceuticals, biological and life sciences, material science, etc.) may have actuators and may put different chemicals, samples, or parts in different combinations and put them under different circumstances. Using conviction to guide the machines enables them to home in on learning how the system under study responds to different scenarios, and, for example, searching areas of greatest uncertainty (e.g., the areas with low conviction as discussed herein). Conceptually speaking, when the conviction or surprisal is combined with a fitness, utility, or value function, especially in a multiplicative fashion, then the combination is a powerful information theoretic approach to the classic exploration vs exploitation trade-offs that are made in search processes from artificial intelligence to science to engineering. Additionally, such a system can automate experiments where it can predict the most effective approach, homing in on the best possible, predictable outcomes for a specific knowledge base. Further, like in the other embodiments discussed herein, it could indicate (e.g., raise alarms) to human operators when the results are anomalous, or even tell which features being measured are most useful (so that they can be appropriately measured) or when measurements are not sufficient to characterize the outcomes. This is discussed extensively elsewhere herein. If the system has multiple kinds of sensors that have "costs" (e.g., monetary, time, computation, etc.) or cannot be all activated simultaneously, the feature entropies or convictions could be used to activate or deactivate the sensors to reduce costs or improve the distinguishability of the experimental results.

In the context of agriculture, growers may experiment with various treatments (plant species or varietals, crop types, seed planting densities, seed spacings, fertilizer types and densities, etc.) in order to improve yield and/or reduce cost. In comparing the effects of different practices (treatments), experimenters or growers need to know if the effects observed in the crop or in the field are simply a product of the natural variation that occurs in every ecological system, or whether those changes are truly a result of the new treatments. In order to ameliorate the confusion caused by overlapping crop, treatment, and field effects, different design types can be used (e.g., demonstration strip, replication control or measurement, randomized block, split plot, factorial design, etc.). Regardless, however, of the type of test design type used, determination of what treatment(s) to use is crucial to success. Using the techniques herein to guide treatment selection (and possible design type) enables experimenters and growers to home in on how the system under study responds to different treatments and treatment types, and, for example, searching areas of greatest uncertainty in the "treatment space" (e.g., what are the types of treatments about which little is known?). Conceptually, the combination of conviction or surprisal with a value, utility, or fitness function such as yield, cost, or a function of yield and cost, become a powerful information theoretic approach to the classic exploration vs exploitation trade-offs that are made in search processes from artificial intelligence to science to engineering. Growers can use this information to choose treatments balancing exploitation (e.g., doing things similar to what has produced high yields previously) and exploration (e.g., trying treatments unlike previous ones, with yet-unknown results). Additionally, the techniques can automate experiments on treatments (either in selection of treatments, designs, or robotic or automated planting using the techniques described herein) where it can predict the most effective approach, and automatically perform the planting or other distribution (e.g., of fertilizer, seed, etc.) required of to perform the treatment. Further, like in the other embodiments discussed herein, it could indicate (e.g., raise alarms) to human operators when the results are anomalous, or even tell which features being measured are most useful or when measurements are not useful to characterize the outcomes (e.g., and may possibly be discarded or no longer measured). If the system has types of sensors (e.g., soil moisture, nitrogen levels, sun exposure) that have "costs" (e.g., monetary, time, computation, etc.) or cannot be all collected or activated simultaneously, the feature entropies or convictions could be used to activate or deactivate the sensors to reduce costs while protecting the usefulness of the experimental results.

In some embodiments, processes 100, 200 may include determining (e.g., in response to a request) the surprisal and/or conviction of one or more data elements or aspects of the experiment control system. The surprisal for the one or more experiment control system data elements or aspects may be determined and a determination may be made whether to select or include the one or more experiment control system data elements or aspects in an experiment control computer-based reasoning model based on the determined surprisal and/or conviction. While there are more sets of one or more experiment control system data elements or aspects to assess, the process may return to determine whether more experiment control system data elements or aspects sets should be included. Once there are no more experiment control system data elements or aspects to consider, the process can cause 240 control of the experiment control system using the experiment control computer-based reasoning model.

In some embodiments, process 100 may determine control rules for an operational situation for use in the experiment control computer-based reasoning model (e.g., based on multiple experiment types, multiple experimenters (e.g., organizations or people), and/or multiple operating environments (e.g., locales, weather, times of year, etc.). Based on a model, such as system control rules, the process can cause 240 control of an experiment control system using process 200. For example, if the data elements are related to experiment control system actions, then the experiment control computer-based reasoning model trained (such as system control rules in a particular operational situation) on that data will control experiment control system. Process 200 proceeds by receiving 210 an experiment control computer-based reasoning model. The process proceeds by receiving 220 a context. The experiment control computer-based reasoning model is then used to determine 230 an action to take. The action is then performed by the control system (e.g., caused by the experiment control computer-based reasoning system). If there are more 250 contexts to consider, then the system returns to determine 210 operational situations or receive 220 those contexts and otherwise ceases 260. In such embodiments, the experiment control computer-based reasoning model may be used to control experiment. The chosen actions are then performed by a control system.

Control of Energy Transfer Systems

The processes 100, 200 may also be used for control systems for energy transfer. For example, a building may have numerous energy sources, including solar, wind, grid-based electrical, batteries, on-site generation (e.g., by diesel or gas), etc. and may have many operations it can perform, including manufacturing, computation, temperature control, etc. The techniques herein may be used to control when certain types of energy are used and when certain energy consuming processes are engaged. For example, on sunny days, roof-mounted solar cells may provide enough low-cost power that grid-based electrical power is discontinued during a particular time period while costly manufacturing processes are engaged. On windy, rainy days, the overhead of running solar panels may overshadow the energy provided, but power purchased from a wind-generation farm may be cheap, and only essential energy consuming manufacturing processes and maintenance processes are performed.

In some embodiments, processes 100, 200 may include determining (e.g., in response to a request) the surprisal and/or conviction of one or more data elements or aspects of the energy transfer system. The surprisal for the one or more energy transfer system data elements or aspects may be determined and a determination may be made whether to select or include the one or more energy transfer system data elements or aspects in energy control computer-based reasoning model based on the determined surprisal and/or conviction. While there are more sets of one or more energy transfer system data elements or aspects to assess, the process may return to determine whether more energy transfer system data elements or aspects should be included. Once there are no more energy transfer system data elements or aspects to consider, the process can turn to controlling or causing control of the energy transfer system using the energy control computer-based reasoning model.

In some embodiments, process 100 may determine control rules for an operational situation for use in the energy transfer computer-based reasoning model. Based on a model, such as system control rules, the process can cause 240 control of an energy transfer system using process 200. For example, if the data elements are related to energy transfer system actions, then the energy control computer-based reasoning model trained on that data will control energy transfer system. Process 200 proceeds by receiving 210 an energy control computer-based reasoning model (such as system control rules in a particular operational situation). The process proceeds by receiving 220 a context. The energy control computer-based reasoning model is then used to determine 230 an action to take. The action is then performed by the control system (e.g., caused by the energy control computer-based reasoning system). If there are more 250 contexts to consider, then the system returns to determine 210 operational situations or receive 220 those contexts and otherwise ceases 260. In such embodiments, the energy control computer-based reasoning model may be used to control energy. The chosen actions are then performed by a control system.

Health Care Decision Making, Prediction, and Fraud Protection

The processes 100, 200 may also be used for health care decision making, prediction (such as outcome prediction), and fraud detection. For example, some health insurers require pre-approval, pre-certification, pre-authorization, and/or reimbursement for certain types of healthcare procedures, such as healthcare services, administration of drugs, surgery, hospital visits, etc. When analyzing pre-approvals, a health care professional must contact the insurer to obtain their approval prior to administering care, or else the health insurance company may not cover the procedure. Not all services require pre-approval, but many may, and which require it can differ among insurers (e.g., different operational situations). Health insurance companies may make determinations including, but not necessarily limited to, whether a procedure is medically necessary, whether it is duplicative, whether it follows currently-accepted medical practice, whether there are anomalies in the care or its procedures, whether there are anomalies or errors with the health care provider or professional, etc.

In some embodiments, a health insurance company may have many "features" of data on which health care pre-approval or reimbursement decisions are determined by human operators. These features may include diagnosis information, type of health insurance, requesting health care professional and facility, frequency and/or last claim of the particular type, etc. The data on previous decisions can be used to train the computer-based reasoning system. The techniques herein may be used to guide the health care decision making process. For example, when the computer-based reasoning model determines, with high conviction or confidence, that a procedure should be pre-approved or reimbursed, it may pre-approve or reimburse the procedure without further review. In some embodiments, when the computer-based reasoning model has low conviction re whether or not to pre-approve a particular procedure, it may flag it for human review (including, e.g., sending it back to the submitting organization for further information). In some embodiments, some or all of the rejections of procedure pre-approval or reimbursement may be flagged for human review. In some embodiments, the system may be directed to use control rules associated with a particular operational situation (e.g., a combination of one or more of insurer, particular legal or regulatory regime, particular time or year, particular hospital or other provider, particular person or system making the decision, etc.).

Further, in some embodiments, the techniques herein can be used to flag trends, anomalies, and/or errors. For example, as explained in detail elsewhere herein, the techniques can be used to determine, for example, when there are anomalies for a request for pre-approval, diagnoses, reimbursement requests, etc. with respect to the computer-based reasoning model trained on prior data. When the anomaly is detected, (e.g., outliers, such as a procedure or prescription has been requested outside the normal range of occurrences per time period, for an individual that is outside the normal range of patients, etc.; and/or what may be referred to as "inliers"-or "contextual outliers," such as too frequently (or rarely) occurring diagnoses, procedures, prescriptions, etc.), the pre-approval, diagnosis, reimbursement request, etc. can be flagged for further review. In some cases, these anomalies could be errors (e.g., and the health professional or facility may be contacted to rectify the error), acceptable anomalies (e.g., patients that need care outside of the normal bounds), or unacceptable anomalies. Additionally, in some embodiments, the techniques herein can be used to determine and flag trends (e.g., for an individual patient, set of patients, health department or facility, region, etc.). The techniques herein may be useful not only because they can automate and/or flag pre-approval decision, reimbursement requests, diagnosis, etc., but also because the trained computer-based reasoning model may contain information (e.g., prior decision) from multiple (e.g., 10s, 100s, 1000s, or more) prior decision makers. Consideration of this large amount of information may be untenable for other approaches, such as human review.

The techniques herein may also be used to predict adverse outcomes in numerous health care contexts. The computer-based reasoning model may be trained with data from previous adverse events, and perhaps from patients that did not have adverse events. The trained computer-based reasoning system can then be used to predict when a current or prospective patient or treatment is likely to cause an adverse event. For example, if a patient arrives at a hospital, the patient's information and condition may be assessed by the computer-based reasoning model using the techniques herein in order to predict whether an adverse event is probable (and the conviction of that determination). As a more specific example, if a septuagenarian with a history of low blood pressure is admitted for monitoring a heart murmur, the techniques herein may flag that patient for further review. In some embodiments, the determination of a potential adverse outcome may be an indication of one or more possible adverse events, such as a complication, having an additional injury, sepsis, increased morbidity, and/or getting additionally sick, etc. Returning to the example of the septuagenarian with a history of low blood pressure, the techniques herein may indicate that, based on previous data, the possibility of a fall in the hospital is unduly high (possibly with high conviction). Such information can allow the hospital to try to ameliorate the situation and attempt to prevent the adverse event before it happens.

In some embodiments, the techniques herein include assisting in diagnosis and/or diagnosing patients based on previous diagnosis data and current patient data (e.g., based on the control rules for an expert and/or other operational situation. For example, a computer-based reasoning model may be trained with previous patient data and related diagnoses using the techniques herein. The diagnosis computer-based reasoning model may then be used in order to suggest one or more possible diagnoses for the current patient. As a more specific example, a septuagenarian may present with specific attributes, medical history, family history, etc. This information may be used as the input context to the diagnosis computer-based reasoning system, and the diagnosis computer-based reasoning system may determine one or more possible diagnoses for the septuagenarian. In some embodiments, those possible diagnoses may then be assessed by medical professionals. The techniques herein may be used to diagnose any condition, including, but not limited to breast cancer, lung cancer, colon cancer, prostate cancer, bone metastases, coronary artery disease, congenital heart defect, brain pathologies, Alzheimer's disease, and/or diabetic retinopathy.

In some embodiments, the techniques herein may be used to generate system control rules that mimic the techniques of experts and/or systems, and/or related to other particular operational situations. These control rules can be generated for any of the uses of the techniques described herein (manufacturing, image labelling, self-driving vehicles, etc.), and can be particularly important in circumstances where the techniques and abilities of individuals providing the data (and the operational situations in which they are acting) are important to mimic, such as adherence to policy or regulation. As discussed elsewhere herein, the control rules can be generated to directly mimic the characteristics of the training data, combine the characteristics of multiple trainers, etc.

In some embodiments, processes 100, 200 may include determining (e.g., in response to a request) the surprisal and/or conviction of one or more data elements or aspects of the health care system. The surprisal or conviction for the one or more health care system data elements or aspects may be determined and a determination may be made whether to select or include the one or more health care system data elements or aspects in a health care system computer-based reasoning model based on the determined surprisal and/or conviction. While there are more sets of one or more health care system data elements or aspects to assess, the process may return to determine whether more health care system data elements or aspects should be included. Once there are no more health care system data elements or aspects to consider included in the model, the process can turn to controlling or causing control of the health care computer-based reasoning system using the health care system computer-based reasoning model.

In some embodiments, process 100 may determine control rules for an operational situation for use in the health care system computer-based reasoning model. Based on a model, such as system control rules, the process can cause 240 control of a health care computer-based reasoning system using process 200. For example, if the data elements are related to health care system actions, then the health care system computer-based reasoning model trained on that data will control the health care system. Process 200 proceeds by receiving 210 a health care system computer-based reasoning model (such as system control rules in a particular operational situation). The process proceeds by receiving 220 a context. The health care system computer-based reasoning model is then used to determine 230 an action to take. The action is then performed by the control system (e.g., caused by the health care system computer-based reasoning system). If there are more 250 contexts to consider, then the system returns to determine 210 operational situations or receive 220 those contexts and otherwise ceases 260. In such embodiments, the health care system computer-based reasoning model may be used to assess health care decisions, predict outcomes, etc. In some embodiments, the chosen action(s) are then performed by a control system.

Financial Decision Making, Prediction, and Fraud Protection

The processes 100 and/or 200 may also be used for financial decision making, prediction (such as outcome or performance prediction), and/or fraud detection. For example, some financial systems require approval, certification, authorization, and/or reimbursement for certain types of financial transactions, such as loans, lines of credit, credit or charge approvals, etc. When analyzing approvals, a financial professional may determine, as one example, whether to approve prior to loaning money. Not all services or transactions require approval, but many may, and which require it can differ among financial system or institutions. Financial transaction companies may make determinations including, but not necessarily limited to, whether a loan appears to be viable, whether a charge is duplicative, whether a loan, charge, etc. follows currently-accepted practice, whether there are anomalies associated with the loan or charge, whether there are anomalies or errors with the any party to the loan, etc. The techniques described herein may determination of control rules one or more operational situations (e.g., a combination of one or more of particular legal and/or regulatory regime, decisions of expert (systems or people), time of year, etc.)

In some embodiments, a financial transaction company may have many "features" of data on which financial system decisions are determined by human operators. These features may include credit score, type of financial transaction (loan, credit card transaction, etc.), requesting financial system professional and/or facility (e.g., what bank, merchant, or other requestor), frequency and/or last financial transaction of the particular type, etc. The data on previous decisions can be used to train the computer-based reasoning system. The techniques herein may be used to guide the financial system decision making process. For example, when the computer-based reasoning model, such as control rules, determine, with high conviction or confidence, that a financial transaction should be approved (e.g., with high conviction), it may the approve the transaction without further review (e.g., by a human operator). In some embodiments, when the computer-based reasoning model has low conviction re whether or not to approve a particular transaction, it may flag it for human review (including, e.g., sending it back to the submitting organization for further information or analysis). In some embodiments, some or all of the rejections of approvals may be flagged for human review.

Further, in some embodiments, the techniques herein can be used to flag trends, anomalies, and/or errors. For example, as explained in detail elsewhere herein, the techniques can be used to determine, for example, when there are anomalies for a request for approval, etc. with respect to the control rules (e.g., a combination of one or more of particular legal and/or regulatory regime, decisions of expert (systems or people), time of year, etc.). When the anomaly is detected, (e.g., outliers, such as a transaction has been requested outside the normal range of occurrences per time period, for an individual that is outside the normal range of transactions or approvals, etc.; and/or what may be referred to as "inliers"-or "contextual outliers," such as too frequently (or rarely) occurring types of transactions or approvals, unusual densities or changes to densities of the data, etc.), the approval may be flagged for further review. In some cases, these anomalies could be errors (e.g., and the financial professional or facility may be contacted to rectify the error), acceptable anomalies (e.g., transactions or approvals are legitimate, even if outside of the normal bounds), or unacceptable anomalies. Additionally, in some embodiments, the techniques herein can be used to determine and flag trends (e.g., for an individual customer or financial professional, set of individuals, financial department or facility, systems, etc.). The techniques herein may be useful not only because they can automate and/or flag approval decisions, transactions, etc., but also because the trained computer-based reasoning model may contain information (e.g., prior decision) from multiple (e.g., 10s, 100s, 1000s, or more) prior decision makers. Consideration of this large amount of information may be untenable for other approaches, such as human review.

In some embodiments, the techniques herein may be used to generate system control rules that mimic the techniques of experts and/or systems. These control rules can be generated for any of the uses of the techniques described herein (manufacturing, image labelling, self-driving vehicles, etc.), and can be particularly important in circumstances where the techniques and abilities of individuals providing the data (and the operational situations in which they are acting) are important to mimic, such as adherence to financial policy or regulation. As discussed elsewhere herein, the control rules can be generated to directly mimic the characteristics of the training data, combine the characteristics of multiple trainers, etc.

In some embodiments, processes 100 and/or 200 may include determining (e.g., in response to a request) the surprisal and/or conviction of one or more data elements or aspects of the financial system. The surprisal and/or conviction for the one or more financial system data elements or aspects may be determined and a determination may be made whether to select or include the one or more financial system data elements or aspects in a financial system computer-based reasoning model based on the determined surprisal and/or conviction. While there are more sets of one or more financial system data elements or aspects to assess, the process may return to determine whether more financial system data elements or aspects should be included. Once there are no more financial system data elements or aspects to consider included in the model, the process can turn to controlling or causing control of the financial system computer-based reasoning system using the financial system computer-based reasoning model.

In some embodiments, processes 100 and/or 200 may determine (e.g., in response to a request) control rules in the computer-based reasoning model for use in the financial system computer-based reasoning model. Based on a model, such as system control rules, the process can cause 240 control of a financial system computer-based reasoning system using process 200. For example, if the data elements are related to financial system actions, then the financial system computer-based reasoning model trained on that data will control the financial system. Process 200 proceeds by receiving 210 a financial system computer-based reasoning model (such as system control rules in a particular operational situation). The process proceeds by receiving 220 a context. The financial system computer-based reasoning model is then used to determine 230 an action to take. The action is then performed by the control system (e.g., caused by the financial system computer-based reasoning system). If there are more 250 contexts to consider, then the system returns to determine 210 operational situations or receive 220 those contexts and otherwise ceases 260. In such embodiments, the financial system computer-based reasoning model may be used to assess financial system decisions, predict outcomes, etc. In some embodiments, the chosen action(s) are then performed by a control system.

Real Estate Future Value and Valuation Prediction

The techniques herein may also be used for real estate value estimation. For example, the past values and revenue from real estate ventures may be used as training data. This data may include, in addition to value (e.g., sale or resale value), compound annual growth rate ("CAGR"), zoning, property type (e.g., multifamily, Office, Retail, Industrial), adjacent business and types, asking rent (e.g., rent per square foot ("sqft") for each of Office, Retail, Industrial, etc. and/or per unit (for multifamily buildings), further, this may be based on all properties within the selected property type in a particular geography, for example), capitalization rate (or "cap rate" based on all properties within selected property type in a geography), demand (which may be quantified as occupied stock), market capitalization (e.g., an average modeled price per sqft multiplied by inventory sqft of the given property type and/or in a given geography), net absorption (net change in demand for a rolling 12 month period), net completions (e.g., net change in inventory sqft (Office, Retail, Industrial) or units (Multifamily) for a period of time, such as analyzed data element(s) rolling 12 month period), occupancy (e.g., Occupied sqft/total inventory sqft, 100%-vacancy %, etc.), stock (e.g., inventory square footage (Office, Retail, Industrial) or units (Multifamily), revenue (e.g., revenue generated by renting out or otherwise using a piece of real estate), savings (e.g., tax savings, depreciation), costs (e.g., taxes, insurance, upkeep, payments to property managers, costs for findings tenants, property managers, etc.), geography and geographic location (e.g., views of water, distance to shopping, walking score, proximity to public transportation, distance to highways, proximity to job centers, proximity to local universities, etc.), building characteristics (e.g., date built, date renovated, etc.), property characteristics (e.g., address, city, state, zip, property type, unit type(s), number of units, numbers of bedrooms and bathrooms, square footage(s), lot size(s), assessed value(s), lot value(s), improvements value(s), etc.—possibly including current and past values), real estate markets characteristics (e.g., local year-over-year growth, historical year-over-year growth), broader economic information (e.g., gross domestic product growth, consumer sentiment, economic forecast data), local economic information (e.g., local economic growth, average local salaries and growth, etc.), local demographics (e.g., numbers of families, couples, single people, number of working-age people, numbers or percentage of people with at different education, salary, or savings levels, etc.). The techniques herein may be used to train a real estate computer-based reasoning model based on previous properties. Once the real estate computer-based reasoning system has been trained, then input properties may be analyzed using the real estate reasoning system. Using the techniques herein, the surprisal and/or conviction of the training data can be used to build a real estate computer-based reasoning system that balances the size of the computer-based reasoning model with the information that each additional property record (or set of records) provides to the model.

The techniques herein may be used to predict performance of real estate in the future (as control rules). For example, based on the variables associated discussed here, that are related, e.g., with various geographies, property types, and markets, the techniques herein may be used to find property types and geographies with the highest expected value or return (e.g., as CAGR). As a more specific example, a model of historical CAGR with asking rent, capitalization rate, demand, net absorption, net completions, occupancy, stock, etc. can be trained. That model may be used, along with more current data, to predict the CAGR of various property types and/or geographies over the coming X years (e.g., 2, 3, 5, or 10 years). Such information may be useful for predicting future value for properties and/or automated decision making. These control rules may be based on the operational situation (e.g., a combination of one or more of the neighborhood, city, state, country, purchaser type, valuation expert, etc.)

As another example, using the techniques herein, a batch of available properties may be given as input to the real estate computer-based reasoning systems (e.g., representing one or more operational situations), and the real estate computer-based reasoning system may be used to determine what properties are likely to be good investments. In some embodiments, the predictions of the computer-based reasoning system may be used to purchase properties. Further, as discussed extensively herein, explanations may be provided for the decisions. Those explanation may be used by a controllable system to make investment decisions and/or by a human operator to review the investment predictions. Further, that data may represent different operational situations and the techniques may be used to determine valuations based on the control rules of one or more operational situations.

In some embodiments, processes 100, 200 may include determining the surprisal and/or conviction of each input real estate data case (or multiple real estate data cases) with respect to the associated labels or of the aspects of the computer-based reasoning model. The surprisal and/or conviction for the one or more real estate data cases may be determined and a determination may be made whether to select or include the one or more real estate data cases in the real estate computer-based reasoning model based on the determined surprisal and/or conviction. While there are more sets of one or more real estate data cases to assess, the process may return to determine whether more real estate data case sets should be included or whether aspects should be included and/or changed in the model. Once there are no more training cases to consider, the process can turn to controlling or causing control of predicting real estate investments information for possible use in purchasing real estate using the real estate computer-based reasoning.

In some embodiments, process 100 may determine control rules for an operational situation for use in the real estate system computer-based reasoning model. Based on a model, such as system control rules, the process can cause 240 control of a real estate system, using, for example, process 200. For example, the training data elements are related to real estate, and the real estate computer-based reasoning model trained on that data will determined investment value(s) for real estate data cases (properties) under consideration. These investment values may be any appropriate value, such as CAGR, monthly income, resale value, income or resale value based on refurbishment or new development, net present value of one or more of the preceding, etc. In some embodiments, process 200 begins by receiving 210 a real estate computer-based reasoning model (such as system control rules in a particular operational situation). The process proceeds by receiving 220 properties under consideration for labeling and/or predicting value(s) for the investment opportunity. The real estate computer-based reasoning model is then used to determine 230 values for the real estate under consideration. The prediction(s) for the real estate is (arc) then made 240. If there are more 250 properties to consider, then the system returns to determine 210 operational situations or receive 220 data on those properties and otherwise ceases 260. In some embodiments, the real estate computer-based reasoning model may be used to determine which training properties are "closest" (or most similar) to the incoming property or property types and/or geographies predicted as high value. The investment value(s) for the properties under consideration may then be determined based on the "closest" properties or property types and/or geographies.

Cybersecurity

The processes 100, 200 may also be used for cybersecurity analysis. For example, a cybersecurity company or other organization may want to perform threat (or anomalous behavior) analysis, and in particular may want explanation data associated with the threat or anomalous behavior analysis (e.g., why was a particular event, user, etc. identified as a threat or not a threat?). The computer-based reasoning model may be trained using known threats/anomalous behavior and features associated with those threats or anomalous behavior. Data that represents neither a threat nor anomalous behavior (e.g., non-malicious access attempts, non-malicious emails, etc.) may also be used to train the computer-based reasoning model. In some embodiments, when a new entity, user, packet, payload, routing attempt, access attempt, log file, etc. is ready for assessment, the features associated with that new entity, user, packet, payload, routing attempt, access attempt, log file, etc. may be used as input in the trained cybersecurity computer-based reasoning system. The cybersecurity computer-based reasoning system may then determine the likelihood that the entity, user, packet, payload, routing attempt, access attempt, pattern in the log file, etc. is or represents a threat or anomalous behavior. Further, explanation data, such as a conviction measures, training data used to make a decision etc., can be used to mitigate the threat or anomalous behavior and/or be provided to a human operator in order to further assess the potential threat or anomalous behavior.

Any type of cybersecurity threat or anomalous behavior can be analyzed and detected, such as denial of service (DOS), distributed DOS (DDOS), brute-force attacks (e.g., password breach attempts), compromised credentials, malware, insider threats, advanced persistent threats, phishing, spear phishing, etc. and/or anomalous traffic volume, bandwidth use, protocol use, behavior of individuals and/or accounts, logfile pattern, access or routing attempt, etc. In some embodiments the cybersecurity threat is mitigated (e.g., access is suspended, etc.) while the threat is escalated to a human operator. As a more specific example, if an email is received by the email server, the email may be provided as input to the trained cybersecurity computer-based reasoning model. The cybersecurity computer-based reasoning model may indicate that the email is a potential threat (e.g., detecting and then indicating that email includes a link to a universal resource locator that is different from the universal resource location displayed in the text of the email). In some embodiments, this email may be automatically deleted, may be quarantined, and/or flagged for review.

In some embodiments, processes 100, 200 may include determining (e.g., in response to a request) the surprisal and/or conviction of one or more data elements or aspects of the cybersecurity system. The surprisal or conviction for the one or more cybersecurity system data elements or aspects may be determined and a determination may be made whether to select or include the one or more cybersecurity system data elements or aspects in a cybersecurity system computer-based reasoning model based on the determined surprisal and/or conviction. While there are more sets of one or more cybersecurity system data elements or aspects to assess, the process may return to determine whether more cybersecurity system data elements or aspects should be included. Once there are no more cybersecurity system data elements or aspects to consider, the process can turn to controlling or causing control of the cybersecurity computer-based reasoning system using the cybersecurity system computer-based reasoning model.

In some embodiments, process 100 may determine control rules for an operational situation for use in the cybersecurity system computer-based reasoning model. Based on a model, such as system control rules, the process can cause 240 control of a cybersecurity computer-based reasoning system using process 200. For example, if the data elements are related to cybersecurity system actions, then the cybersecurity system computer-based reasoning model trained on that data will control the cybersecurity system (e.g., quarantine, delete, or flag for review, entities, data, network traffic, etc.). Process 200 proceeds by receiving 210 a cybersecurity system computer-based reasoning model (such as system control rules in a particular operational situation). The process proceeds by receiving 220 a context. The cybersecurity system computer-based reasoning model is then used to determine 230 an action to take. The action is then performed by the control system (e.g., caused by the cybersecurity system computer-based reasoning system). If there are more 250 contexts to consider, then the system returns to determine 210 operational situations or receive 220 those contexts and otherwise ceases 260. In such embodiments, the cybersecurity system computer-based reasoning model may be used to assess cybersecurity threats, etc. In some embodiments, the chosen action(s) are then performed by a control system.

Evolving Control Rules

In some embodiments, the control rules include context-action pairs and the control rules may be evolvable. The context-action pairs may include context and associated actions (described elsewhere herein). Evolving the context-action pairs may include combining two or more context-action pairs to form a third context-action pairs using evolutionary programming techniques.

The evolution of control rules may be used for any controllable systems, such as in health care, finance, image labelling, autonomous vehicles, etc. Turning to the example of vehicle control rules, in many of the examples herein, two separate sets of vehicle control rules are compared, and/or evolved 150 to form a single set of vehicle control rules. In some embodiments, the vehicle control rules each come from a separate source (e.g., two operators Alicia or Carole), or more than two sources (e.g., operators (or teams led by) Alicia, Bob, Carole, Diane, etc.) In the embodiments where the vehicle control rules being evolved are from a single source (potentially even from a single operator), the vehicle control rules may be combined and evolved. For example, Alicia's vehicle control rules might include multiple left turn sets of context-action pairs which might be evolved together. Additionally, in some embodiments, there may be multiple vehicle control rules for a single operator (e.g., Alicia or her team have operated a vehicle multiple times). In such embodiments, the multiple vehicle control rules may be compared, selected, and combined in a manner similar to what is described herein for multiple vehicle control rules from multiple operators.

As discussed, the techniques herein also apply to vehicle control rules of more than two operators or teams (e.g., Alicia, Bob, Carole, etc.). Consider for example, four sets of vehicle control rules from Alicia, Bob, Carole, and Diane. The techniques herein may combine the sets of vehicle control rules from any combination of Alicia, Bob, Carole, and Diane together, including comparing, selecting, and combining sets of vehicle control rules of one operator with those of the same operator as described in the single-operator context. When there are more than two sets of vehicle control rules from multiple operators, the sets of vehicle control rules from the operators may be compared, selected, and evolved in various ways. For example, the sets of vehicle control rules may be paired off and combined in pairs in a manner similar to that described for the two sets of vehicle control rules. As another example, in some embodiments, more than two or all the sets of vehicle control rules may be compared, pairs selected, and combined. For example, if vehicle control rules from Diane are compared against the sets of vehicle control rules of Alicia, Bob, and Carole, there may be pairs selected that represent sets of vehicle control rules from various combinations such as Diane: Alicia, Diane: Bob, and Diane: Carole. If this comparison is performed among all of the sets of sets of vehicle control rules, then the possible combined pairs could be from all (or some subset of) combinations of Alicia, Bob, Carole, and Diane.

In some embodiments, the two stored sets of vehicle control rules can be combined and merged, can be mutated, etc. An example of evolution 150 might have two sets of vehicle control rules, in this case context-action pairs from Alicia and Bob related to left turns:

|  | Alicia | Bob |
|---|---|---|
| Left lane ("LL", Boolean) | 1 | 1 |
| Left Turn Signal On ("LT", Boolean) | 1 | 1 |
| Distance to Light ("DTL") | 120' | 110' |
| Speed of vehicle, MPH | 15 | DTL/10 |
| Action to be taken | Turn left at 0.7° | Turn left at 0.7° |

Combining these two sets of vehicle control rules could take all identical elements between the two, and keep those. For the non-identical elements, the DTL and speed, one or the other might be chosen (at random or based on some other criteria), a random number between the two might be chosen, etc.

In various embodiments, sets of vehicle control rules can also be mutated (before, after, or as part of evolving 150). For example, returning to the context-action pair example above, one or more of elements of the context or action may be mutated. This can be advantageous to give the population extra variance. If the resultant vehicle control rules after mixing Alicia and Bob above were as written on the left, they might be mutated as shown on the right below:

|  | Result of cross-over between Alicia and Bob | After mutation |
| --- | --- | --- |
| Left lane ("LL", Boolean) | 1 | 1 |
| Left Turn Signal On ("LT", Boolean) | 1 | 1 |
| Distance to Light ("DTL") | 112.5' | 99' |
| Speed of vehicle, MPH | 7.5 + DTL/20 | Speed = 1 + DTL/11 |
| Action to be taken | Turn left at 0.7° | Turn left at MAX (30°, 50/DTL°) |

As depicted, the mutation can be of the context and/or the action to be taken. Further, mutations can include replacing numbers or constants with functions and/or variables, and vice-versa, as well as replacing numbers with numbers or functions with functions. Such functions can be based on, for example, one of the context variables. As depicted above, the speed and action to be taken were each mutated to a function of DTL. In some embodiments, mutations may also include removing actions (leaving the action empty or making the action a NULL), as well as mutating NULL or empty actions to include an action.

Mutations may be done randomly, or based on "seeding" the system with various parameters. For example, those working on the system, such as operators, operators, trainers, etc., may know that the angle of a turn should increase and the speed should decrease the closer a vehicle gets to making a turn, but not know which function is correct. So, they may provide seed functions or general constraints, and the system may "experiment" with various functions that use those seed function and/or meet those general constraints. For example, the system may be seeded with various functions or portions of functions for turn angle, for example, the system could be seeded that the turn angle is likely the function of one or more of sin (speed), cos (speed), 1/speed, 1/DTL, speed, DTL,) min (0°,) max (30°, etc. Then the system could insert one or more of these elements to make functions for the left turn angle. This could be done while taking into account the candidate vehicle control rules (Alicia's, Bob's, or a mixture thereof), or may be independent of the candidate vehicle control rules.

In some embodiments, the mutations are a resampling of numbers in the context and/or action. For example, the resampling of numbers in the context and/or action may simply be varying the set of vehicle control rules numbers using any function, including: sampling within a set percent, sampling the numbers over the observed range of the numbers, or resampling using a maximum entropy distribution with a mean at the number from the original vehicle control rules. As an example of maximum entropy distribution, if a number from the context or action is known to be nonnegative but no other domain knowledge is known about the distribution of that number in other contexts/actions, a resample may consist of drawing a random number from the maximal entropy distribution for a nonnegative number for a given mean, namely an exponential distribution, whose mean is represented by the original number from the context or action. For example, just looking at the sample from Alicia, the distance to the light might be resampled using a maximum entropy distribution with mean of 120', which might result in a DTL of 112.5'. Further, if the set of vehicle control rules has certain observed properties, then the mutated number may be constrained to meet those properties. For example, if observed values are positive, the system may maintain the mutated value as a positive value. If the observed values are integers, the system may maintain the mutated value as an integer.

If something is known about the domain, it can be used in the system to hold the mutations within those known constraints. As such, in some embodiments, the system can allow a domain expert to constrain parts of the context and/or the action. For example, if it is known that Left Lane (LL) is Boolean, then the system can constrain any mutations to being either 0 or 1 (or True or False, depending on the implementation).

In some embodiments, the system may include per-context-field modifiers or constraints. These can be the same or different between sets of vehicle control rules. These modifiers might act on the data in the set of vehicle control rules. Such actions might be a Get (e.g., clamp), Mutate (e.g., force resampling in a certain range), or Mix (e.g., average for two inputs, return one or the other), or another function or constraint. These modifiers can be useful in instances where one might want to override the default way in which the system operates. Further, modifiers might be useful, for example, when you want the set of vehicle control rules to abide by certain constraints, even if the experts or operators did not abide by those constraints. One such example is abiding by speed limits or norms. Modifiers might be used to clamps the speed of the training drivers. For example, Alicia's set of vehicle control rules may have a modifier that clamps speed between 0 and 50 MPH, and Bob may have the same constraint, or a different constraint such as clamping speed between −10 and 45 MPH. Any training value outside those constraints may be clamped back to those values. When the modifiers are the same between two candidate sets of vehicle control rules being combined, the system may simply include the modifier unchanged. If they are different, then the modifiers might be mixed or bred in a manner similar to that described the above. For example, the modifier for Alicia and Bob's speed might be averaged (clamp between −5 and 47.5 MPH) or resampled in any other way. Modifiers might also be mutated in manners similar to that described above. In some embodiments, when two sets of vehicle control rules are mixed or bred as part of evolving 150, or elsewhere, a portion of each is used, resulting in a "whole" or 100% of the vehicle control rules. For example, in a particular instance, the system may use 40% of Alicia's vehicle control rules and 60% of Bob's, resulting in a 100% or whole vehicle control rules. In some embodiments, the resulting vehicle control rules may be constructed based on more (or less) than 100% combined. For example, the system may use a combined 110% (70% Alicia and 40% Bob), or more, of the candidate sets of vehicle control rules. Using more than 100% combined vehicle control rules may be advantageous when the evolutionary aspects of the mutation might remove portions of the context and/or action, remove a link between the context and the action, and/or make part of the context invalid. For example, the mutation might remove the indication of LL, or Left Lane, from the context. If it turns out that the removed portion of the context is actually needed for proper performance, it could be useful for there to be a way to reintroduce elements, such as using more than 100% combined of the candidate sets of vehicle control rules. Generally, combining together more than 100% of two candidate sets of vehicle control rules might be implemented as a Boolean "OR" of the two sets of vehicle control rules in order to maintain any pieces that are unique to each set of vehicle control rules, or possibly 80-100% of the Boolean OR of the two trees. Further, in some embodiments, it will be useful to keep all of both sets of each set of vehicle control rules, notwithstanding that there could be some duplication of context variables.

Example Control Hierarchies

In some embodiments, the technique herein may use a control hierarchy to control controllable systems and/or cause actions to be taken (e.g., as part of causing 240 the action to the taken depicted in FIG. 2). There are numerous example control hierarchies, and one is presented below. In some embodiments, only a portion of this control hierarchy is used. It is also possible to add levels to (or remove levels from) the control hierarchy.

An example control hierarchy for controlling a vehicle could be:
- Primitive Layer—Active vehicle abilities (accelerate, decelerate), lateral, elevation, and orientation movements to control basic vehicle navigation
- Behavior Layer—Programmed vehicle behaviors which prioritize received actions and directives and prioritize the behaviors in the action.
- Unit Layer—Receives orders from command layer, issues moves/directives to the behavior layer.
- Command Layers (hierarchical)—Receives orders (e.g., as part of causing 240 actions to be taken in FIG. 2) and gives orders to elements under its command, which may be another command layer or unit layer.
- Similar control hierarchies may be used with other control systems, such as in health care, finance, etc.

System Overview

FIG. 3 depicts an example system for computer-based reasoning for operational situation control. System 300 includes elements connected by a communicative coupling or network 390. Examples of communicative coupling and networks are described elsewhere herein. In some embodiments, the processes 100 and 200 of FIGS. 1 and 2 may run on the system 300 of FIG. 3 and/or the hardware 400 of FIG. 4. For example, the described functions of process 100 and/or process 200 may be performed by operational analysis system 310 and/or system control 320. Training data and/or vehicle control rules may be stored at operational analysis system 310, vehicle control 320 and/or communicatively coupled storage 330 or 340. A control 320 may execute the control rules.

Controls 320 may control one or more controllable systems 350-358. Controls may be integrated into a controllable systems 350-358 and/or communicatively coupled to the controllable system 350-358. Controllable systems 350-358 and/or controls 320 may include one or more systems, elements, and mechanisms for controlling operation of controllable systems 350-358, such as programming interfaces, database interfaces, input/output interfaces, graphical user interfaces, steering and directional control mechanisms, propulsion and braking mechanisms, lights (for both illumination and signaling), sensor controls, transmissions, starters, sonic controls (such as horns and speakers), audio and/or video entertainment systems, navigation systems, physical vehicle controls (such as door and window controls, and seat and mirror controls), vehicle comfort systems (such as heat and air conditioning, air filters, cabin pressurizers, seat warmers, and noise cancelling systems), etc. The controls 320 may also include, in various embodiments, one or more of controls for aerodynamic envelope (e.g., spoiler adjustments), suspension and traction control systems, safety systems (e.g., side airbag disabled when particular child car seats are used or certain kinds of cargo stored), and other types of cargo controls (e.g., leave trunk open), anti-theft devices, and service system indicators and messages (e.g., indicating when an oil change or other service is needed).

Each of operational analysis system 310 and control 320 may run on a single computing device, multiple computing devices, in a distributed manner across a network, on one or more virtual machines, which themselves run on one or more computing devices. In some embodiments, operational analysis system 310 and control 320 are distinct sets of processes running on distinct sets of computing devices. In other embodiments, operational analysis system 310 and control 320 are intertwined or share processes or functions and/or run on the same computing devices. In some embodiments, storage 330 and 340 are communicatively coupled to operational analysis system 310 and control 320 via a network 390 or other connection. Storage 330 and 340 may also be part of or integrated with operational analysis system 310 and/or control 320 via a network 390 or other connection.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
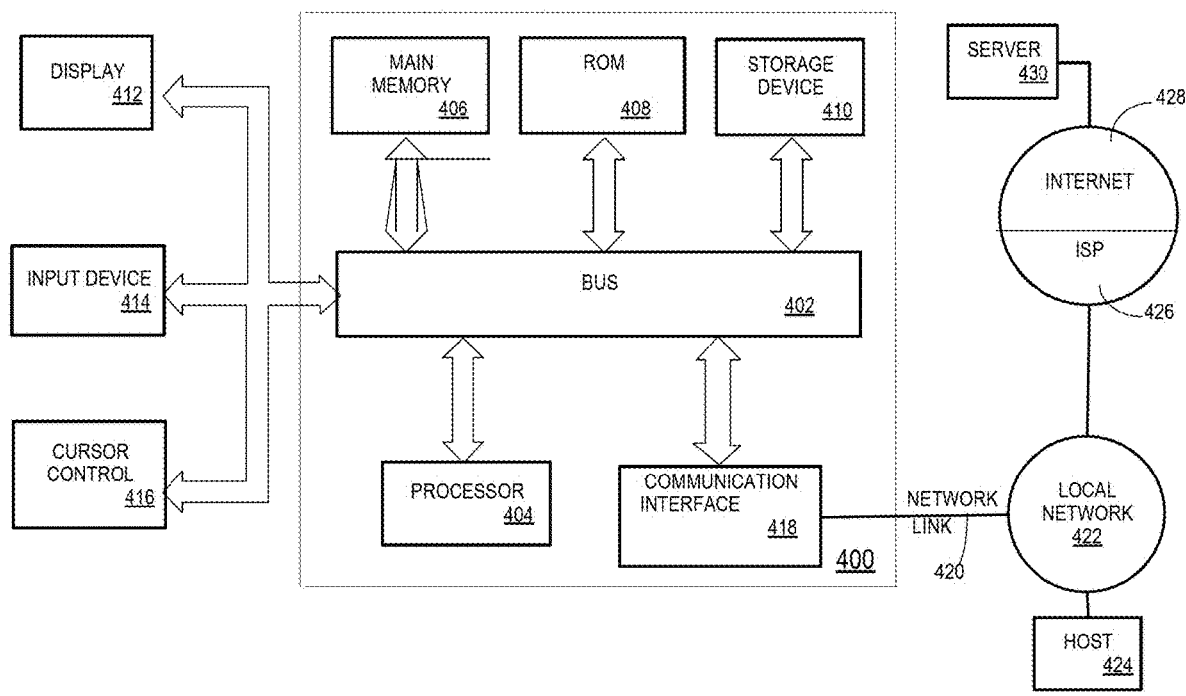
FIG. 4 depicts examples systems and hardware for computer-based reasoning systems for operational situation control of controllable systems.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as an OLED, LED or cathode ray tube (CRT), for displaying information to a computer user. In some embodiments the display 412 includes or is a virtual reality headset, such as a head-mounted display or an augmented reality display. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. The input device may also have more than two degrees of freedom. For example, input device 414 may be a six degree-of-freedom input device that allows movement and rotations in each of three dimensions. The input device 414 may also have multiple input modalities, such as multiple 2-axes controllers, and/or input buttons or keyboard. This allows a user to input along more than two dimensions simultaneously and/or control the input of more than one type of action.

Computer system 400 may implement the techniques described herein using customized hard-wired logic, one or more ASICs or FPGAs, firmware and/or program logic which in combination with the computer system causes or programs computer system 400 to be a special-purpose machine. According to some embodiments, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
    during operation of a first controllable system, repeatedly:
        determining, via an operational analysis system executing on one or more computing devices, first context-action pairs, where each of the first context-action pairs comprise one or more first actions taken related to operation of the first controllable system, each first action being represented as numbers, variables, functions, or a combination of two or more of the foregoing, and a first context in which the one or more first actions were taken, the first context including one or more data elements each representing information related to the first controllable system represented as numbers, variables, functions, or a combination of two or more of the foregoing, wherein each first action is related to operation of the first controllable system in the first context, wherein the first context relates, at least in part, to the operation of the first controllable system during a period of time; and storing, via the operational analysis system executing on the one or more computing devices, a first set of context-action pairs for each first action taken and the first context in which it is taken;

during operation of a second controllable system after operation of the first controllable system:

determining, via the operational analysis system executing on the one or more computing devices, a second context for the second controllable system, wherein the second context is different from the first context, wherein the second context comprises one or more data elements each representing information related to the second controllable system represented as numbers, variables, functions, or a combination of two or more of the foregoing;

determining, via the operational analysis system executing on the one or more computing devices, a second action to take based at least in part on the second context of the second controllable system and the first set of context-action pairs, wherein determining the second action to take based at least in part on the second context of the second controllable system and the first set of context-action pairs comprises:

determining distance values of the second context to context-action pairs in the first set of context-action pairs, wherein the distance values are determined using a distance metric;

determining N closest context-action pairs based on the distance values of the second context to the context-action pairs in the first set of context-action pairs, wherein N is two or greater;

determining the second action to take based at least in part on the determined N closest context-action pairs; and controlling, via a control system executing on the one or more computing devices, characteristics of execution of the second controllable system based on the second action determined based on the second context.

2. The method of claim 1, further comprising:

determining, via the one or more computing devices, third context-action pairs, where each of the third context-action pairs comprise one or more third actions taken related to a third operation of a third controllable system in a third operational situation, each third action being represented as numbers, variables, functions, or a combination of two or more of the foregoing, and a third context in which the one or more third actions were taken, the third context including one or more data elements each representing information related to the third controllable system represented as numbers, variables, functions, or a combination of two or more of the foregoing, wherein each third action is related to a third operation of the third controllable system in the third context and the third operational situation;

determining, via the one or more computing devices, a third set of context-action pairs for the third operational situation based at least in part on the third context-action pairs;

determining, via the one or more computing devices, whether to perform an additional operation of the second controllable system using the third set of context-action pairs based at least in part on a comparison of the second operational situation with each of the particular operational situation and the third operational situation;

when a determination is made to use the third set of context-action pairs for operation of the second controllable system, determining the second action to take based at least in part on the second context of the second controllable system and the third set of context-action pairs for the particular operational situation.

3. The method of claim 2, where determining whether to perform an additional operation of the second controllable system using the third set of context-action pairs comprises comparing geographic regions associated with each of the particular operational situation, the second operational situation, and the third operational situation.

4. The method of claim 2, where determining whether to perform an additional operation of the second controllable system using the third set of context-action pairs comprises comparing times of day, weather, road congestion, cargo quantities and types, passenger types and preferences, and road conditions associated with each of the particular operational situation, the second operational situation, and the third operational situation.

5. The method of claim 2, where determining whether to perform an additional operation of the second controllable system using the third set of context-action pairs comprises comparing driver identities associated with each of the particular operational situation, the second operational situation, and the third operational situation.

6. The method of claim 2, where determining whether to perform an additional operation of the second controllable system using the third set of context-action pairs comprises comparing vehicle types associated with each of the particular operational situation, the second operational situation, and the third operational situation.

7. The method of claim 1, further comprising evolving the first set of context-action pairs for the particular operational situation, wherein evolving the first set of context-action pairs comprises combining two or more context-action pairs to form a third context-action pairs using evolutionary programming techniques.

8. The method of claim 1, further comprising:

detecting an anomalous action related to operation of the second controllable system;

determining a particular context-action pair associated with the anomalous action detected; and providing information associated with the particular context-action pair via a graphical user interface.

9. The method of claim 1, further comprising, during operation of an additional controllable system in an additional operational situation repeatedly:

determining additional actions taken related to operation of the additional controllable system in the additional operational situation, and an additional context in which the additional actions were taken;

storing an additional set of context-action pairs for the additional operational situation related to each additional action taken and the additional context in which it is taken; and during the operation of the second controllable system:
  determining the second action to take based at least in part on the second context of the second controllable system, the first set of context-action pairs for the particular operational situation and the additional set of context-action pairs.

10. The method of claim 9, further comprising:
  determining a first action and an associated first confidence level based on the first set of context-action pairs and the second context;
  determining an additional action and an associated additional confidence level based at least in part on the additional set of context-action pairs and the second context; and
  determining the second action to take based at least in part on the first confidence level and the additional confidence level.

11. The method of claim 1, wherein acting on the second action determined based on the second context comprises controlling the second controllable system based at least in part on the second action.

12. The method of claim 1, wherein acting on the second action determined based on the second context comprises controlling a simulation of the second controllable system.

13. A system for executing instructions, wherein said instructions are instructions which, when executed by one or more computing devices, cause performance of a process including:
  during a first operation of a first controllable system in a first operational situation, repeatedly:
    training a first machine intelligence system based on first actions taken and a first context in which those first actions were taken, wherein each first action is related to the first operation of the first controllable system in the first context and first operational situation, wherein each first action is represented as numbers, variables, functions, or a combination of two or more of the foregoing, the first context includes one or more data elements each representing information related to the first controllable system represented as numbers, variables, functions, or a combination of two or more of the foregoing, and the first operational situation relates to the operation of the first controllable system over a period of time;
  during a second operation of a second controllable system in a second operational situation, repeatedly:
    training a second machine intelligence system based on second actions taken and a second context in which those second actions were taken, wherein each second action is related to the second operation of the second controllable system in the second context and second operational situation, wherein each second action is represented as numbers, variables, functions, or a combination of two or more of the foregoing, the second context includes one or more data elements each representing information related to the second controllable system represented as numbers, variables, functions, or a combination of two or more of the foregoing, and the second operational situation relates to the operation of the second controllable system over a period of time; and
  determining whether to perform a third operation of a third controllable system in a third operational situation the first machine intelligence system or the second machine intelligence system based at least in part on a comparison of the third operational situation and the first operational situation and the second operational situation;
  based on the determining to perform the third operation of the third controllable system in the third operational situation using the first machine intelligence system:
    determining a third context for the third controllable system;
    determining a third action to take based at least in part on the third context of the third controllable system and the first machine intelligence system, wherein determining the third action to take based at least in part on the third context of the third controllable system and the first machine intelligence system comprises:
      determining distance values of the third context to context-action pairs in the first machine intelligence system, wherein the distance values are determined using a distance metric;
      determining N closest context-action pairs based on the distance values of the third context to the context-action pairs in the first machine intelligence system, wherein N is two or greater;
      determining the second action to take based at least in part on the determined N closest context-action pairs and
    controlling characteristics of execution based on the third action determined based on the third context and the first machine intelligence system; and
  based on the determining based on the determining to perform the third operation of the third controllable system in the third operational situation using the second machine learning system:
    determining a fourth context for the third controllable system;
    determining a fourth action to take based at least in part on the fourth context of the third controllable system and the second machine intelligence system; and
    controlling characteristics of execution of the third controllable system based on the fourth action determined based on the fourth context and the second machine intelligence system.

14. The system of claim 13, wherein the system further comprises a control mechanism for the second controllable system and wherein acting on the third action comprises controlling, using the control mechanism, the second controllable system based at least in part on the third action.

15. The system of claim 13, wherein determining whether to perform the third operation of the third controllable system in the third operational situation using the first machine intelligence system or the second machine intelligence system comprises comparing geographic region associated with the third operational situation with geographical regions associated with each of the operational situation and the second operational situation.

16. The system of claim 13, wherein determining whether to perform the third operation of the third controllable system in the third operational situation using the first machine intelligence system or the second machine intelligence system comprises comparing times of day, weather, road congestion, cargo quantities and types, passenger types and preferences, and road conditions associated with the third operational situation with those associated with each of the first operational situation and the second operational situation.

17. The system of claim 13, wherein determining whether to perform the third operation of the third controllable system in the third operational situation using the first machine intelligence system or the second machine intelligence system comprises comparing driver identities associated with the third operational situation with those associated with each of the first operational situation and the second operational situation.

18. A non-transitory computer readable storage medium storing instructions which, when executed by one or more computing devices, cause the one or more computing devices to perform a process of:

during a first operation of a first controllable system in a particular operational situation, repeatedly:

determining first actions taken related to the first operation of the first controllable system in the particular operational situation, and a first context in which the first actions were taken, wherein each first action is related to the first operation of the first controllable system in the first context and particular operational situation, and wherein each first action is represented as numbers, variables, functions, or a combination of two or more of the foregoing, the first context includes one or more data elements each representing information related to the first controllable system represented as numbers, variables, functions, or a combination of two or more of the foregoing, and the particular operational situation relates to the operation of the first controllable system over a period of time; and storing a first set of context-action pairs for the particular operational situation related to each first action taken and the first context in which it is taken;

during operation of a second controllable system in a second operational situation:

determining a second context for the second controllable system;

determining a second action to take based at least in part on the second context of the second controllable system and the first set of context-action pairs for the particular operational situation, wherein determining the second action to take based at least in part on the second context of the second controllable system and the first set of context-action pairs comprises:

determining distance values of the second context to context-action pairs in the first set of context-action pairs, wherein the distance values are determined using a distance metric;

determining N closest context-action pairs based on the distance values of the second context to the context-action pairs in the first set of context-action pairs, wherein N is two or greater;

determining the second action to take based at least in part on the determined N closest context-action pairs; and controlling characteristics of execution of the second controllable system based on the second action determined based on the second context, wherein each second action is represented as numbers, variables, functions, or a combination of two or more of the foregoing, the second context includes one or more data elements each representing information related to the second controllable system represented as numbers, variables, functions, or a combination of two or more of the foregoing, and the second operational situation relates to the operation of the second controllable system over a period of time.

19. The non-transitory computer readable storage medium of claim 18, the process further comprising:

detecting an anomalous action related to operation of the second controllable system;

determining a particular context-action pair associated with the anomalous action detected; and providing information associated with the particular context-action pair via a graphical user interface.

20. The non-transitory computer readable storage medium of claim 18, the process further comprising:

detecting an anomalous action related to operation of the second controllable system;

determining a particular context-action pair associated with the anomalous action detected; and providing information associated with the particular context-action pair.

* * * * *